United States Patent
Henke

(10) Patent No.: US 10,024,495 B2
(45) Date of Patent: Jul. 17, 2018

(54) FOLDED SHEETS OF MATERIAL FOR USE AS A STRUCTURAL MEMBER AND ASSEMBLY THEREOF

(71) Applicant: North Carolina Agricultural and Technical State University, Greensboro, NC (US)

(72) Inventor: Mitchell E. Henke, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 264 days.

(21) Appl. No.: 14/920,347

(22) Filed: Oct. 22, 2015

(65) Prior Publication Data

US 2016/0040828 A1    Feb. 11, 2016

Related U.S. Application Data

(62) Division of application No. 13/232,994, filed on Sep. 14, 2011, now Pat. No. 9,185,984.

(Continued)

(51) Int. Cl.
*F16S 3/08* (2006.01)
*B32B 1/06* (2006.01)
(Continued)

(52) U.S. Cl.
CPC ............ *F16S 3/08* (2013.01); *A47B 47/0008* (2013.01); *A47B 96/14* (2013.01); *A47C 5/005* (2013.01); *B32B 1/06* (2013.01); *B32B 1/08* (2013.01); *B32B 3/04* (2013.01); *F16B 7/00* (2013.01); *F16B 12/46* (2013.01); *A47B 96/205* (2013.01); *A47B 2220/0083* (2013.01);
(Continued)

(58) Field of Classification Search
CPC ..................................................... E04B 1/2608
See application file for complete search history.

(56) References Cited

U.S. PATENT DOCUMENTS 1,213,374 A * 1/1917 Hosken .................. A63H 33/04
446/111
1,376,087 A * 4/1921 Fliedner .................. A63H 3/52
446/109

(Continued)

FOREIGN PATENT DOCUMENTS

DE    8426386 U1 * 11/1984
DE    8812961 U1 * 12/1988    ............. A47B 47/06
(Continued)

OTHER PUBLICATIONS

Machine Translation of WO 2008017201 A1.*
Machine Translation of DE 8812961 U1, Dec. 1988.*
Machine Translation of DE 202008000742 U1, Jan. 2008.*

*Primary Examiner* — Jeffrey A Vonch
(74) *Attorney, Agent, or Firm* — Olive Law Group, PLLC

(57) ABSTRACT

Disclosed herein are folded sheets of material for use as a structural member and assembly thereof. According to an aspect, a sheet of material defines one or more tabs, slots, and a plurality of fold lines. The fold lines are spaced such that folding the sheet along the fold lines places the slots in substantial alignment for receiving the at least one tab such that a structural member having a web formed in an interior thereof is formed.

13 Claims, 25 Drawing Sheets

Related U.S. Application Data

(60) Provisional application No. 61/382,663, filed on Sep. 14, 2010.

(51) Int. Cl.

| | | |
|---|---|---|
| *B32B 3/04* | (2006.01) | |
| *B32B 1/08* | (2006.01) | |
| *A47B 47/00* | (2006.01) | |
| *A47B 96/14* | (2006.01) | |
| *A47C 5/00* | (2006.01) | |
| *F16B 12/46* | (2006.01) | |
| *F16B 7/00* | (2006.01) | |
| *B65D 19/00* | (2006.01) | |
| *B32B 3/26* | (2006.01) | |
| *A63H 33/06* | (2006.01) | |
| *F16B 12/00* | (2006.01) | |
| *B32B 3/02* | (2006.01) | |
| *B32B 3/08* | (2006.01) | |
| *A47F 5/10* | (2006.01) | |
| *A47B 96/20* | (2006.01) | |

(52) U.S. Cl.
CPC .......... *A47C 5/00* (2013.01); *A47F 5/10* (2013.01); *A63H 33/06* (2013.01); *B32B 3/02* (2013.01); *B32B 3/08* (2013.01); *B32B 3/266* (2013.01); *B65D 19/00* (2013.01); *B65D 2519/00273* (2013.01); *F16B 12/00* (2013.01); *Y10T 428/24008* (2015.01); *Y10T 428/24314* (2015.01)

(56) References Cited

U.S. PATENT DOCUMENTS

| | | | | |
|---|---|---|---|---|
| 2,160,221 A * | 5/1939 | Masters | B65D 5/5033 156/207 |
| 2,604,342 A * | 7/1952 | Holmes | A63H 33/107 403/219 |
| 2,611,160 A * | 9/1952 | Hanesse | A63H 33/107 182/228.1 |
| 2,708,329 A * | 5/1955 | Mckee | A63H 33/065 446/108 |
| 2,716,532 A * | 8/1955 | Wysong, Jr. | B65D 71/0092 108/51.3 |
| 2,736,475 A * | 2/1956 | Lehman | A47F 1/00 211/85.4 |
| 2,894,303 A * | 7/1959 | Armstrong | A47F 3/12 211/184 |
| 2,926,941 A * | 3/1960 | Thompson | A47B 47/0008 403/173 |
| 3,218,097 A * | 11/1965 | Bowers | A47B 47/0008 285/231 |
| 3,292,796 A * | 12/1966 | Paige | A47F 5/114 211/132.1 |
| 3,372,813 A * | 3/1968 | Ishida | A47F 5/116 211/135 |
| 3,586,359 A * | 6/1971 | Cecelski | E04B 1/58 403/219 |
| 3,830,011 A * | 8/1974 | Ochrymowich | A63H 33/102 403/171 |
| 4,215,711 A * | 8/1980 | Hermanson | A45B 13/00 135/15.1 |
| 4,272,208 A * | 6/1981 | Jones | E04B 1/2608 403/232.1 |
| 4,351,246 A * | 9/1982 | Hutchins, Jr. | A47B 47/06 108/156 |
| 4,551,127 A * | 11/1985 | Rich | A63H 33/04 242/546.1 |
| 4,619,089 A * | 10/1986 | Stein | E04B 2/702 403/326 |
| 4,638,745 A * | 1/1987 | Sheffer | A47F 5/112 108/156 |
| 4,824,112 A * | 4/1989 | Roy | A63F 9/1288 273/157 R |
| 4,874,341 A * | 10/1989 | Ziegler | A63H 33/08 446/104 |
| 5,016,853 A * | 5/1991 | Cox | A47G 33/12 248/174 |
| 5,282,343 A * | 2/1994 | Stein | E04B 1/18 403/382 |
| 5,605,396 A * | 2/1997 | Chin, Jr. | F21V 1/06 312/140 |
| 5,613,770 A * | 3/1997 | Chin, Jr. | F21V 1/06 248/220.1 |
| 5,662,508 A * | 9/1997 | Smith | A63H 33/04 229/127 |
| 5,860,650 A * | 1/1999 | Scobbie | A63F 9/088 273/157 R |
| 5,961,365 A * | 10/1999 | Lambert | A63H 33/10 403/170 |
| 6,022,165 A * | 2/2000 | Lin | E04B 1/2608 403/170 |
| D431,454 S * | 10/2000 | Krupinski | D8/382 |
| 6,237,300 B1* | 5/2001 | Carne | E04B 2/58 52/281 |
| 2004/0144041 A1* | 7/2004 | Fleishman | A63H 33/084 52/80.1 |
| 2006/0157380 A1* | 7/2006 | Lowry | B65D 5/5033 206/594 |
| 2008/0155944 A1* | 7/2008 | Bertele | A47B 43/02 53/450 |
| 2008/0157582 A1* | 7/2008 | Bertele | A47B 43/02 297/440.12 |
| 2012/0000059 A1* | 1/2012 | Fox | F16B 2/20 29/525.01 |
| 2013/0134676 A1* | 5/2013 | Knell | A63F 9/12 273/156 |
| 2013/0272777 A1* | 10/2013 | Hayter | E06B 3/9645 403/205 |

FOREIGN PATENT DOCUMENTS

| | | | | |
|---|---|---|---|---|
| DE | 4314682 A1 * | 11/1994 | | A47B 87/0246 |
| DE | 202008000742 U1 * | 1/2008 | | |
| EP | 222130 A2 * | 5/1987 | | |
| EP | 1688068 A1 * | 8/2006 | | A47C 5/005 |
| ES | 2133232 A1 * | 9/1999 | | A63F 9/12 |
| ES | 2281244 A1 * | 9/2007 | | |
| FR | 2328427 A1 * | 5/1977 | | A47B 47/06 |
| FR | 2812274 A1 * | 2/2002 | | A47B 43/00 |
| FR | 2812526 A1 * | 2/2002 | | A47B 57/10 |
| GB | 2344770 A * | 6/2000 | | A63H 33/12 |
| GB | 2427300 A * | 12/2006 | | A47F 5/114 |
| WO | WO-2004042237 A1 * | 5/2004 | | A47F 5/114 |
| WO | WO 2008017201 A1 * | 2/2008 | | A63F 9/12 |

* cited by examiner

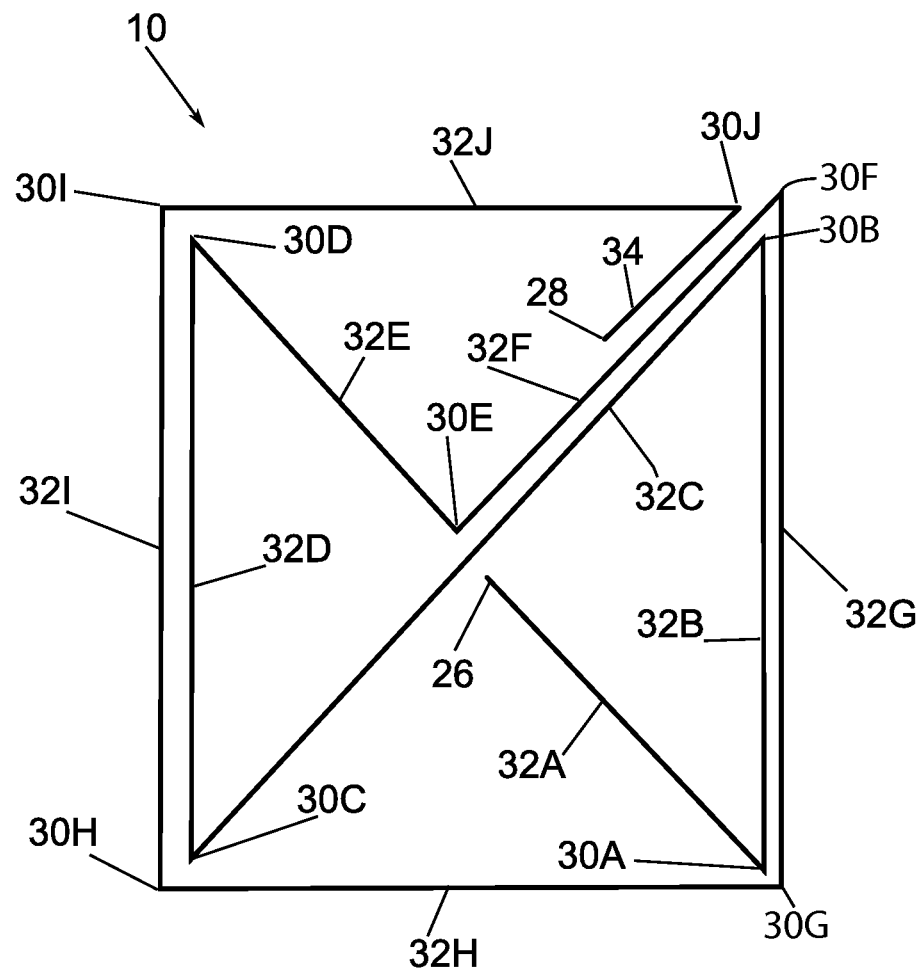
FIG. 1B(ii)

FOLDED SHEETS OF MATERIAL FOR USE AS A STRUCTURAL MEMBER AND ASSEMBLY THEREOF

CROSS REFERENCE TO RELATED APPLICATION

This U.S. divisional patent application claims the benefit of U.S. utility patent application Ser. No. 13/232,994, filed Sep. 14, 2011, which claims the benefit of U.S. provisional patent application No. 61/382,663, filed Sep. 14, 2010; the contents of which are hereby incorporated herein by reference in their entireties.

TECHNICAL FIELD

The present disclosure relates to structural members. More particularly, the present disclosure relates to structural members formed from a folded sheet of material.

BACKGROUND

Structural members such as support legs, horizontal supports, and connectors for support legs and horizontal supports, can be formed employing processes such as extruding, metal forming, molding, and casting. These processes typically require specialized machinery and operators or craftsman having specialized skills. Accordingly, the structural members are often produced and assembled at a first location and transported to an end user at another location.

Transporting structural members and assemblies can result in packaging or stacking a plurality of the structural members together. It is typically desired to maximize the number of structural members in a given volumetric space to minimize costs of transporting the structural members. However, the produced and assembled structural members often are of a shape that includes cavities formed therein or that result in the structural members being spaced apart when packaged or stacked. Accordingly, the volumetric space employed to transport the structural members can include a significant amount of empty space which increases the volumetric space required to transport the structural members and thus increases costs of transporting the structural members.

For at least the aforementioned reasons, it is desirable to provide improved materials for transportation and assembly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are folded sheets of material for use as a structural member and assembly thereof. According to an aspect, improved materials are disclosed herein for transportation and assembly. For example, at an end user, a folded sheet of material as disclosed herein may be assembled to form a desired structure.

According to an aspect, a sheet of material defines one or more tabs, slots, and a plurality of fold lines. The fold lines are spaced such that folding the sheet along the fold lines places the slots in substantial alignment for receiving the at least one tab such that a structural member having a web formed in an interior thereof is formed.

According to another aspect, a sheet of material defines a plurality of fold lines and attachment portions, wherein the fold lines are spaced such that folding the sheet along the fold lines places the attachment portions in substantial alignment such that a structural member having a web formed in an interior thereof is formed. Aligned attachment portions may include portions that are adhered together. Further, aligned attachment portions may include a tab that may be received into a slot for attachment.

According to another aspect, a framework of interconnected structural members may be formed from sheets of material. The framework includes an elongate member having a first end and a second end and a web formed in an interior thereof. The elongate member is formed from a first sheet of material defining one or more tabs, a pair of slots, and a plurality of fold lines. The fold lines are spaced such that folding the sheet along the fold lines places the slots in substantial alignment for receiving the tabs such that the elongate member having the web formed in the interior is formed. The framework also includes a connector including at least a first male end and a second male end. The male ends may be received in either the first end or the second end of the elongate member to selectively join together a plurality of the elongate members. The connector is formed from a second sheet of material defining a plurality of fingers. The second sheet defines a plurality of fold lines. Further, folding the second sheet along the fold lines configures the fingers to form the first male end and the second male end of the connector. Alternately, the connector is formed from one or more sheets of material defining a plurality of fingers wherein the one or more sheets defines a plurality of fold lines, wherein folding the one or more sheets of material along the fold lines configures the fingers to form a first male end, a second male end and a third male end of the connector.

According to yet another aspect, a sheet of material for forming a connector to assemble together a plurality of structural members is disclosed. The sheet defines a plurality of fingers and a plurality of fold lines. Folding the sheet along the fold lines configures the fingers to form a plurality of male ends for receipt in an opening of a structural member to selectively assemble together a plurality of the structural members.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 1B(ii) is another end elevational view of the elongate structural member of FIG. 1 showing an internal web according to an embodiment of the present subject matter;

DETAILED DESCRIPTION

Figure 1A:
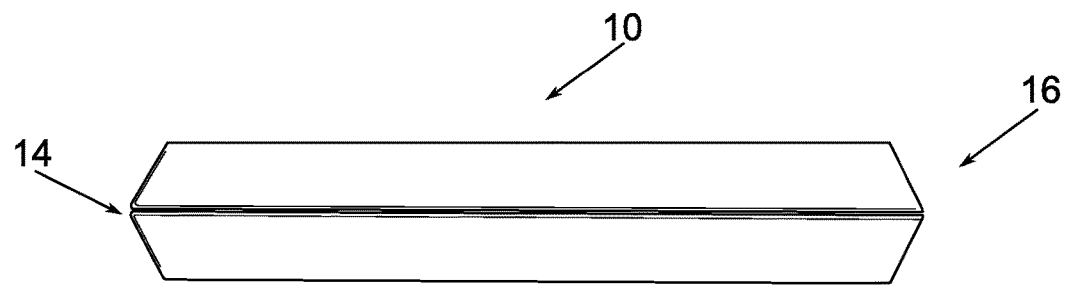
FIG. 1A is a perspective view of an elongate structural member according to an embodiment of the present subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In one aspect, the present application discloses a framework of interconnected structural members formed from sheets of material. The framework comprises an elongate member having a first end and a second end and a web formed in an interior thereof, the elongate member formed from a first sheet of material including at least one tab formed therein and a pair of slots, the first sheet having a plurality of fold lines, wherein folding the first sheet along the fold lines places the slots in substantial alignment for receiving the tab to form the elongate structural member; and a connector having at least a first male end and a second male end, the male ends received in one of the first end and the second end of the elongate member to selectively join together a plurality of the elongate members, the connector formed from a second sheet of material including a plurality of fingers, the second sheet having a plurality of fold lines, wherein folding the second sheet along the fold lines configures the fingers to form the first male end and the second male end of the connector.

In another aspect, the present application discloses a framework of interconnected structural members formed from sheets of material. The framework may include an elongate member having a first end and a second end and a web formed in an interior thereof. The elongate member may be formed from a first sheet of material defining a plurality of attachment portions and a plurality of fold lines. The fold lines may be spaced such that folding the sheet along the fold lines places the attachment portions in substantial alignment for attachment such that a structural member having a web formed in an interior thereof is formed. The attachment portions may be attached together by a suitable adhesive, or a tab and slot as disclosed herein. The framework may include a connector having at least a first male end and a second male end. The male ends may be received in one of the first end and the second end of the elongate member to selectively join together a plurality of the elongate members. The connector may be formed from at least one second sheet of material defining a plurality of fingers. The second sheet may define a plurality of fold lines. Folding the second sheet along the fold lines can configure the fingers to form the first male end and the second male end of the connector.

In an embodiment, structural members of the presently disclosed subject matter are interconnected to form any one or more of a chair, a table, a desk, a trunk, a bench, a stool, a cot, a shelf, a shipping pallet, a shipping crate, a load-carrying platform, a raised floor, a display, and a shelter. In one variation, such structures are used as children's furniture or play structures, in another variation, such structures are used for 'full size' or adult furniture or structures. In another embodiment, the elongate members can be used in place of bricks, such as when bricks are used to support shelves, as in bookshelves. Elongate members disclosed herein can also be used as building blocks in children's play structures. In an embodiment, structural members disclosed herein are not components of a pallet.

In another aspect, the present application discloses a sheet of material for forming an elongate structural member comprising a sheet of material including at least one tab formed therein and a pair of slots, the sheet having a plurality of fold lines, wherein folding the sheet along the fold lines places the slots in substantial alignment for receiving the tab and forms an elongate structural member having a web formed in an interior thereof. In one embodiment, the sheet comprises an end and at least one tab is defined at the end of the sheet. In another embodiment, the tab is defined along one of the fold lines.

According to another aspect, the present application discloses a sheet of material for forming an elongate structural member. The sheet of material may define a plurality of fold lines and adhesive locations. The fold lines may be spaced such that folding the sheet along the fold lines places the adhesive locations in substantial alignment for attachment such that a structural member having a web formed in an interior thereof is formed.

In one embodiment, the elongate member has a cross-sectional area that is a parallelogram. In another embodiment, the elongate member has a cross-sectional area that is a trapezoid. In another embodiment, the elongate member has a cross-sectional area that is a rhombus. In yet another embodiment, the elongate member has a substantially rectangular cross-sectional area. In another embodiment, the elongate member has a substantially square cross-sectional area.

In one embodiment of any disclosed aspect, the cross-sectional area of the web formed in the interior of the elongate member does not have an M, W, or V shape. In another embodiment, the cross-sectional area of the web does not have an M, N, V, W, Y, or Z shape. In one variation, the cross-sectional area of the web generally has an X-shape.

In one variation, the sheet of material for forming an elongate structural member comprises at least about 6 panel segments, or sections, and 5 fold lines, wherein the panel segments and fold lines are identified by means of imprinting said sheet with perforations, ink, pencil, stickers or other such indicative means, such as a set of written instructions. In another variation, the sheet of material for forming an elongate structural member comprises at least about 8 panel segments and 7 fold lines. In yet another variation, the sheet of material for forming an elongate structural member comprises at least about 9 panel segments and 8 fold lines. In a further variation, the sheet of material comprises at least about 10 panel segments and 9 fold lines. In still a further variation, the sheet of material comprises at least about 11 panel segments and 10 fold lines.

In another aspect, the present application discloses a sheet of material for forming a connector to join together a plurality of structural members comprises a sheet of material including a plurality of fingers, the sheet having a plurality of fold lines, wherein folding the sheet along the fold lines configures the fingers to form a plurality of male ends for receipt in an opening of a structural member to selectively join together a plurality of the structural members. In one embodiment, folding the sheet of material along the fold lines aligns two or more fingers in a substantially parallel and adjacent way to one another to form a male end. In one variation, these substantially parallel and adjacent fingers can be adhered to one another.

In one embodiment, the connector formed from a sheet of material as disclosed herein comprises two male ends disposed 180° apart, wherein one male end extends in the opposite direction from a second male end. In another embodiment, the connector formed from a sheet of material as disclosed herein comprises two male ends disposed between about 90° and 180° apart, such as in a 'truss' connector. Alternately, the truss connector comprises two male ends disposed about 135° apart. In yet another embodiment, the connector formed from a sheet of material as disclosed herein comprises two male ends disposed 90° apart (e.g. in an "L" shape). In yet another embodiment, the connector formed from a sheet of material as disclosed herein comprises three male ends disposed in a "T" shape, wherein one male end extends in a direction opposite to a second male end and a third male end extends in a direction perpendicular to the first and second male ends. In yet a further variation, the connector formed from one or more sheets of material as disclosed herein comprises three male ends disposed 90° from one another (e.g. a corner vertex having x, y, and z-distributed male ends). In such an embodiment of a connector having x, y and z-distributed male ends, the connector is formed with one or more sheets of material, two or more sheets of material or three sheets of material, wherein the sheets of material have a plurality of fold lines, wherein folding the multiple sheets along the fold lines to form fingers and interconnecting the folded sheets configures the fingers to form a plurality of male ends.

In one embodiment of any disclosed aspect, the framework of interconnected structural members comprises an adhesive or fastener in addition to or as an alternative to the tabs and slots disclosed herein. Alternately, the framework can be interconnected using alternative methods of joining materials include crimping, welding, soldering, brazing, taping, gluing, or cementing.

Fasteners appropriate for use in accordance with the presently disclosed subject matter can include, but are not limited to, magnets, vacuum means (such as suction cups), anchors, buckles, clamps (or cramps), clasps, Clekos, clips, flanges, grommets, nails, pegs, pins, retaining rings, rivets, rubber bands (or bands of other materials), snaps, staples, stitches, straps, tacks, threaded fasteners, ties, toggles, velcro brand hook-and-loop strips, and zippers.

As used herein, "adhesive" refers to a composition which demonstrates connection when applied to another material or composition generally. Adhesive compositions connect to other materials or compositions generally and no particularly selected properties of the other material or composition are necessary to demonstrate a general tendency to adhere. Adhesives are well-known to those of skill in the art, and include, but are not limited to, tape, glue, and double-sided adhesive strip, In one variation of any of the disclosed aspects or embodiments, the sheet of material comprises foldable materials, including, but not limited to paper, plastic, wood, cloth, metal and composite. In another variation, the sheet of material comprises paper, plastic or cloth; alternately, the sheet of material comprises paper or plastic. In another variation of any of the disclosed aspects or embodiments, the sheet of material comprises plywood, visqueen, fiberboard, container board, paper board, cardboard, corrugated paper, corrugated fiberboard, corrugated plastics, non-corrugated plastics, molded pulp, paper pulp, boxboard (cartonboard), folding boxboard, chipboard, Kraft board, laminated board, solid bleached board, solid bleached sulphate, solid unbleached board, lined chipboard, linerboard, and binder's board. In one variation, the sheet of material is moisture resistant. In another variation the sheet of material is coated, such as with a water-resistant material. In yet another variation, the sheet of material, such as for example, cloth, contains a stiffening agent, such as wax, starch or a polymer, which confers stiffness to the material, allowing it to be folded and maintain its shape. In yet a further variation, the sheet of material is reinforced with a stiffening agent which increases the stiffness and/or sturdiness of the material. In one variation, the sheet of material is single ply; in another variation it is multi-ply. In another variation, the sheet comprises corregated medium, optionally in combination with linerboard.

In an embodiment, structural members disclosed herein can demonstrate a high resistance to bending and crushing. In another embodiment, the structural members disclosed herein can demonstrate increased tensile, compression, and flexure/bend strength.

The following detailed description and appended photographs describe and illustrate various exemplary embodiments of the presently disclosed subject matter. The description and figures serve to enable one skilled in the art to make and use the presently disclosed subject matter, and are not intended to limit the scope of the presently disclosed subject matter in any manner.

FIGS. 1A-1J illustrate various views of an example structural member (or elongate member) 10 and example steps in the assembly thereof in accordance with embodiments of the presently disclosed subject matter. Particularly, FIGS. 1A and 1B(i) illustrate a perspective view and an end elevational view, respectively, of the structural member 10. In this example, the structural member 10 is substantially shaped as a cuboid; however, the structural member 10 may be any other suitable shape. The structural member 10 has a substantially square cross-sectional area and a web 12 formed in an interior of the structural member 10. In the illustrated embodiment, a cross section of the web 10 has a generally "X" shape in cross-section, although the cross-section of the web 10 may be any other suitable shape. For example, the web 10 can be formed having a substantially rectangular cross-sectional area. The structural member 10 includes a first end 14 and a second end 16. The ends 14 and 16 shown in this example are open into the interior of the structural member 10, although one or both of the ends 14 and 16 may be closed.

Figure 1B:
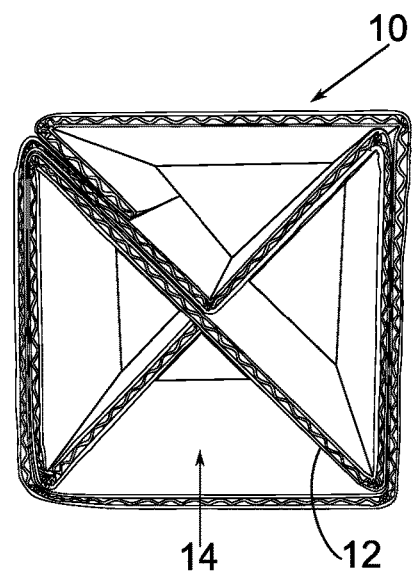
FIG. 1B(i) is an end elevational view of the elongate structural member of FIG. 1 showing an internal web according to an embodiment of the present subject matter.

FIG. 1B(ii) is another end elevational view of the elongate structural member of FIG. 1 showing an internal web according to an embodiment of the present subject matter. FIG. 1B(ii) is a view of the end that opposes the end shown in FIG. 1B(i). Referring to FIG. 1B(ii), the edges 24 and 28 and folds 30A-30J are depicted in an assembled state of the structural member 10. Further, sections 32A-32J and end section 34 are shown.

Figure 1C:
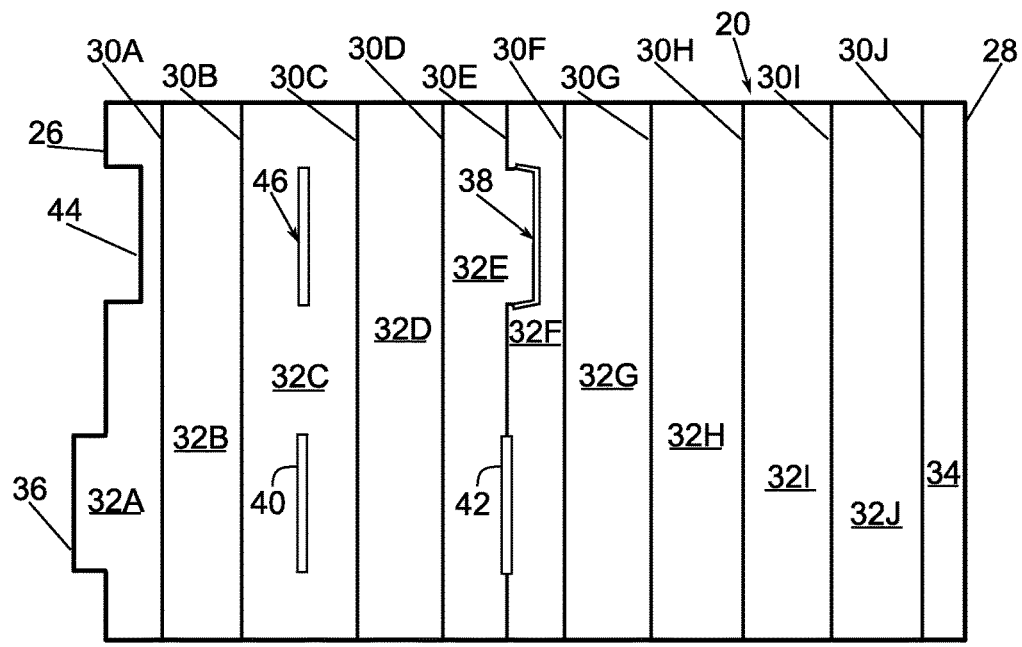
FIG. 1C is a top plan view of a sheet of material from which the elongate structural member of FIGS. 1A and 1B(i) is formed according to an embodiment of the presently disclosed subject matter.

FIG. 1C illustrates a top plan view of a sheet of foldable material 20 from which the example structural member 10 shown in FIGS. 1A and 1B(i) may be formed according to an embodiment of the presently disclosed subject matter. Referring to FIG. 1C, the sheet 20 is a one-piece corrugated sheet, although the sheet 20 may include any number of any suitably shaped corrugated sheets that are attached together in any suitable manner. It should be understood that the sheet 20 can be formed from any suitable type of materials such as, but not limited to, fiberboard, paper board, corrugated plastics, non-corrugated plastics, various foldable materials, and combinations thereof. In this example, the sheet 20 is generally rectangular in shape and defines spaced apart straight edges 22 and 24 and spaced apart straight edges 26 and 28. A length of the edges 26 and 28 is substantially equivalent to a desired end length of the structural member 10 shown in FIG. 1A. Multiple fold lines 30A-30J are formed in the sheet 20. The fold lines 30A-30J extend from the edge 22 to the edge 24 and are substantially parallel to the edges 26 and 28. The fold lines 30A-30J define a plurality of sections 32A-32J in the sheet 20 which can form sides and the web 12 of the structural member 10. An end section 34 is defined by the fold line 30J and the edge 28. As shown in FIG. 1B(i), the end section 34 is adapted to abut a surface of one of the sections 32 in the structural member 10. In the illustrated embodiment, the end section 34 abuts one of the sections 32 forming the web 12. It should be understood that the end section 34 can abut one of the sections 32 forming the outer surface of the structural member 10. An adhesive (not shown) such as a double sided adhesive strip or a glue, for example, can be employed to affix the end section 34 to one of the sections 32.

Figure 1D:
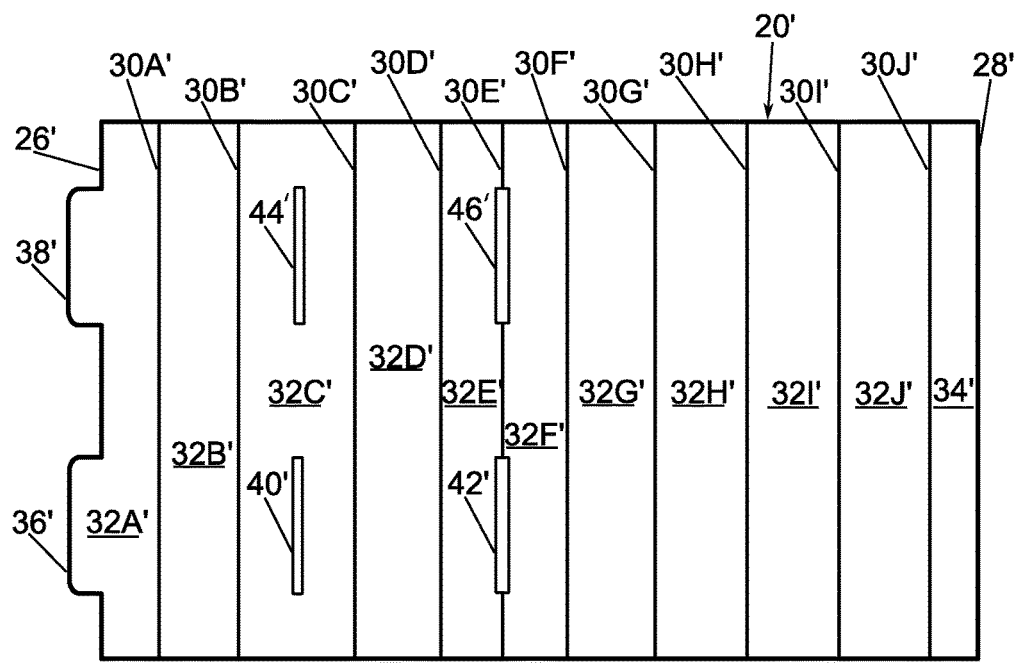
FIG. 1D is a top plan view of another embodiment of a sheet of material from which the elongate structural member of FIGS. 1A and 1B(i) is formed according to an embodiment of the present subject matter.

Tabs 36 and 38 are formed in the sheet 20. A first pair of slots 40 and 42 is formed in the sheet 20 to receive the tab 36. A second pair of slots 44 and 46 is formed in the sheet 20 to receive the tab 38. In the embodiment illustrated in FIG. 1C, the tab 36 is formed in the edge 28 and the slots 40 and 42 are formed in the sections 32 of the sheet 20, and the slot 46 is formed in the edge 28 of the sheet 20 and the tab 38 and the slot 44 are formed in the sections 32. It should be understood that other arrangements of the tabs 36 and 38 and the slots 40, 42, 44, and 46 can be employed. For example, FIG. 1D shows an alternate embodiment of the sheet 20. Structure similar to that illustrated in FIG. 1C includes the same reference numeral and a prime (') symbol for clarity. In FIG. 1D, the tabs 36' and 38' are formed in the edge 28' of the sheet 20'. Further, the slots 40', 42', 44', and 46' are formed in the sections 32' of the sheet 20'.

Figure 1E:
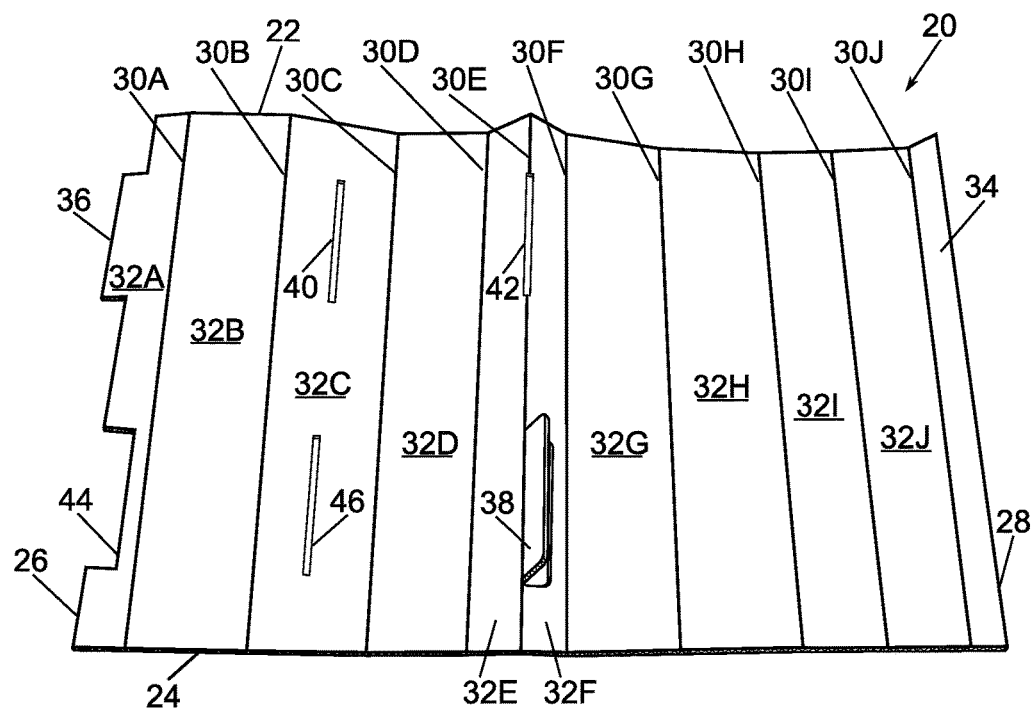
FIGS. 1E-1J are perspective views of the sheet of material of FIG. 1C showing steps of folding the sheet of material to assemble the elongate structural member of FIGS. 1A and 1B(i) according to an embodiment of the present subject matter.
Figure 1F:
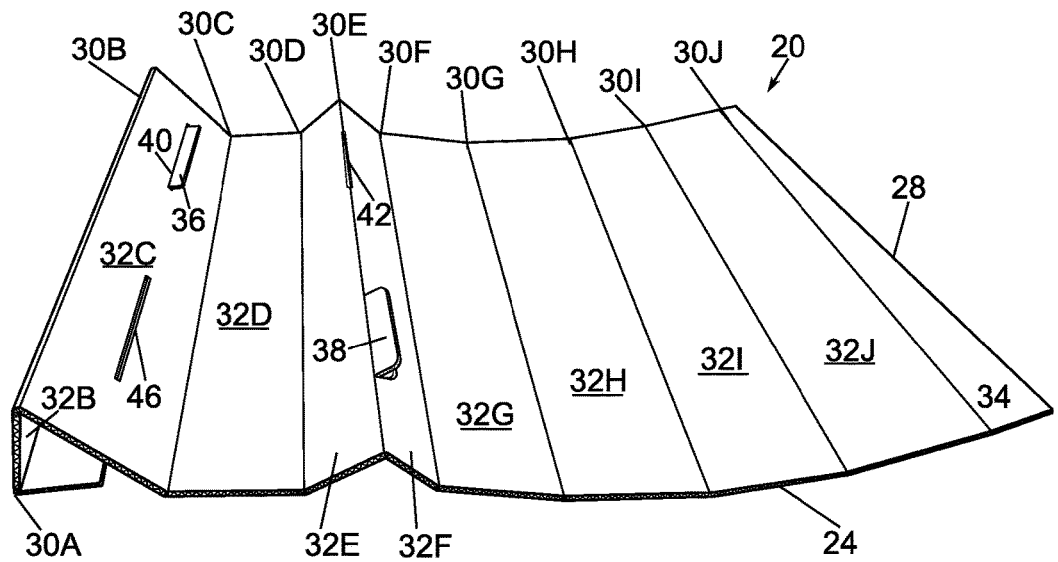
Figure 1G:
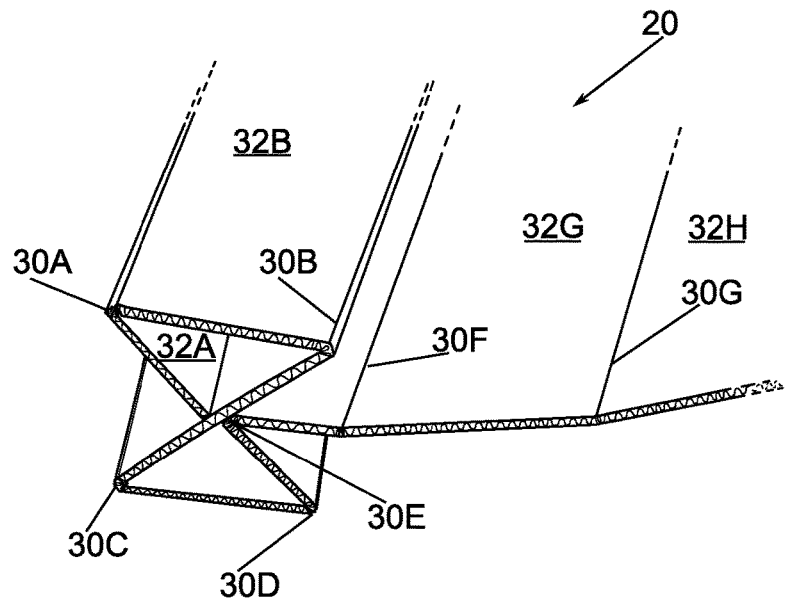
Figure 1H:
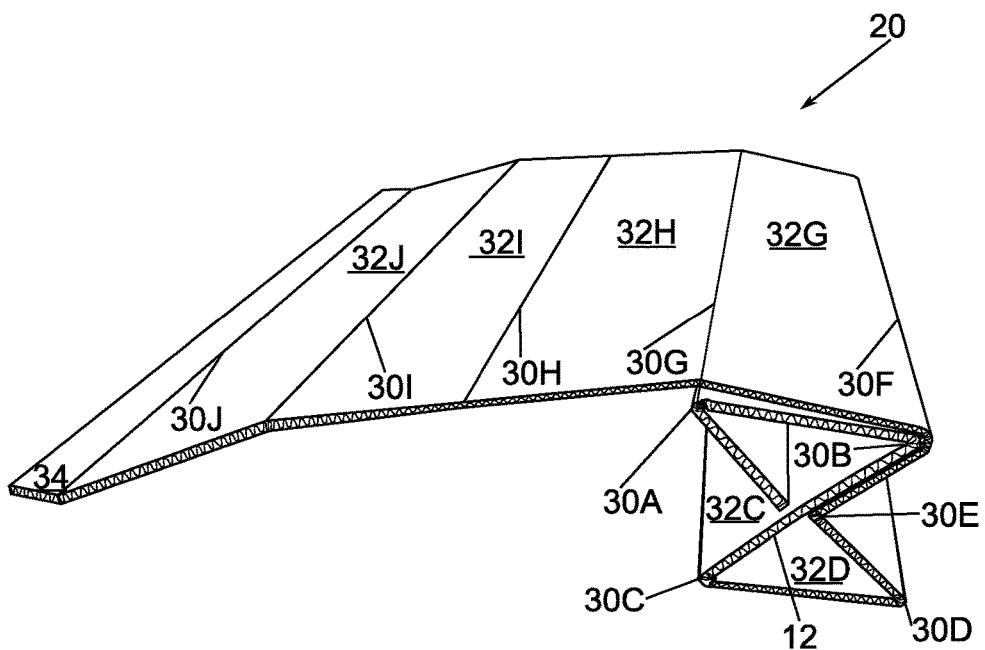
Figure 1I:
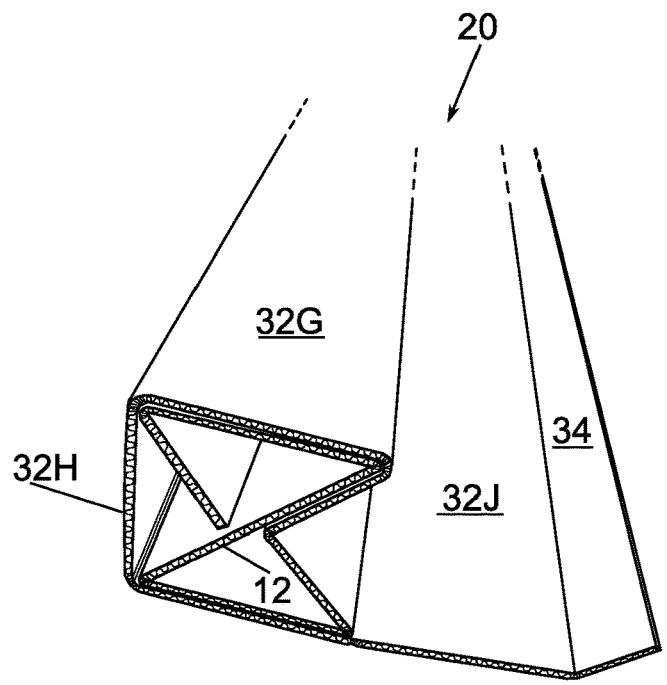
Figure 1J:
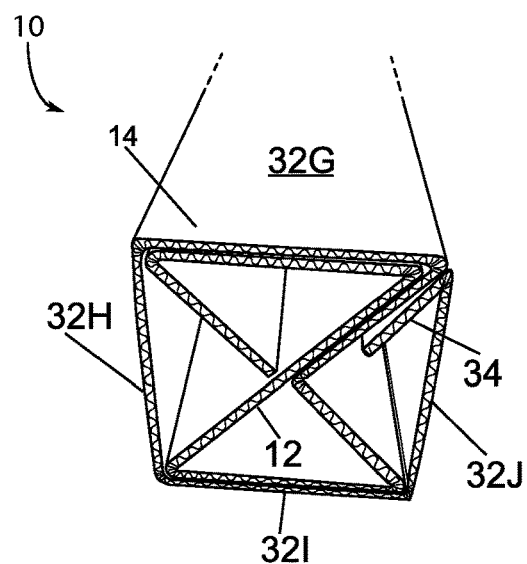

FIGS. 1E-1J illustrate various perspective views of the sheet 20 shown in FIG. 1C at various steps of folding the sheet 20 to assemble the structural member 10 shown in FIGS. 1A and 1B(i). Referring to FIG. 1E, the sheet 20 may be folded along the fold lines 30A and 30B in an initial step, wherein the tab 36 is caused to be received in the slot 40 in a subsequent step as shown in FIG. 1F. The sheet 20 may subsequently be folded along the fold lines 30D, 30E, and 30F, wherein the tab 36 is caused to be received in the slot 42 and the tab 38 is caused to be received by the slots 44 and 46 to form the web 12 of the structural member 10 in another step as shown in FIG. 1G. The sheet 20 may be folded along the fold lines 30F, 30G, 30H, 30I, and 30J, wherein sections 32G, 32H, 32I, and 32J wrap about the web 12 and form outer surfaces of the structural member 10. The section 34 may abut and may be substantially affixed to the section 32F to facilitate maintaining the sheet 20 in the folded configuration forming the structural member 10.

In FIGS. 1A-2J, the tabs and slots as shown can be replaced by adhesives or fasteners consistent with the knowledge of one of skill in the art. Alternately, the structural member 10 can be held in its folded shape using other known methods of joining materials include crimping, welding, soldering, brazing, taping, gluing, or cementing.

Figure 2A:
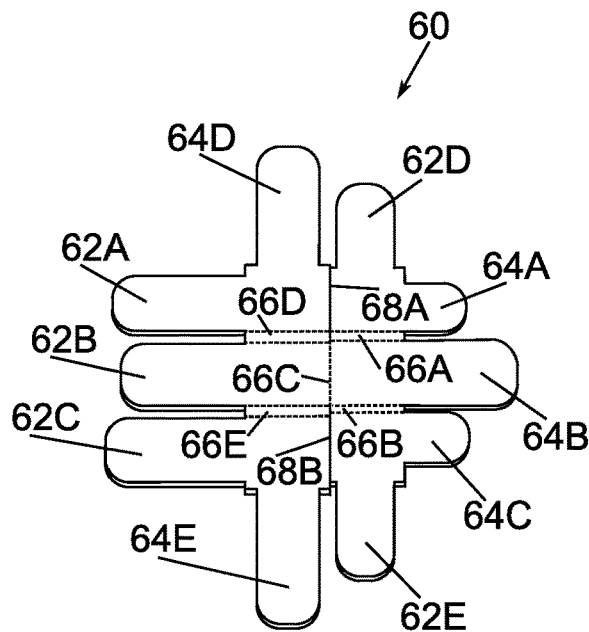
FIG. 2A is a top plan view of a sheet of material from which a ninety-degree connector is formed according to an embodiment of the present subject matter.
Figure 2B:
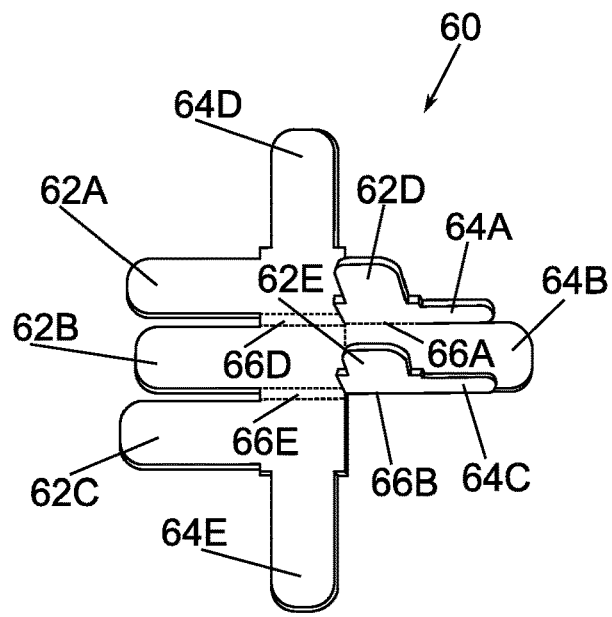
FIGS. 2B-2D are perspective views of the sheet of material of FIG. 2A showing steps of folding the sheet of material to assemble the ninety-degree connector according to an embodiment of the present subject matter.
Figure 2C:
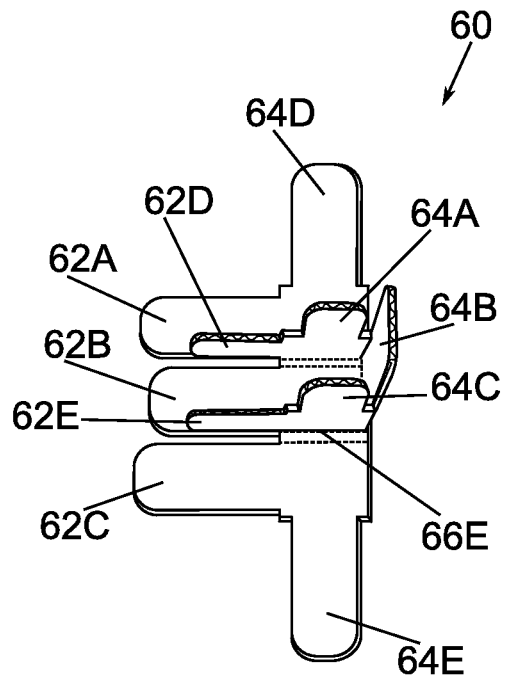
Figure 2D:
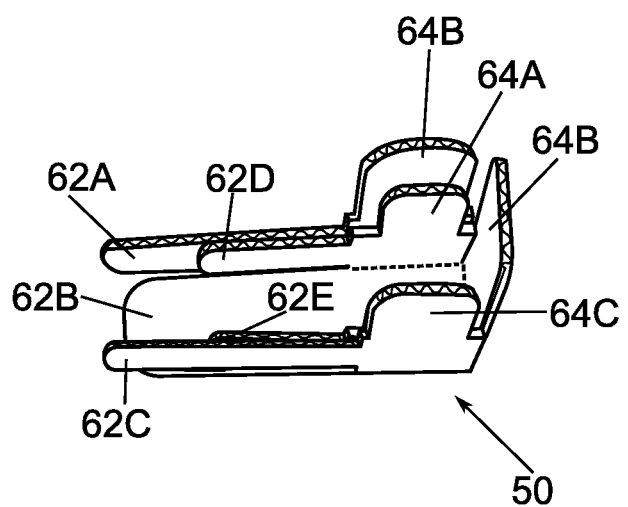
Figure 2E:
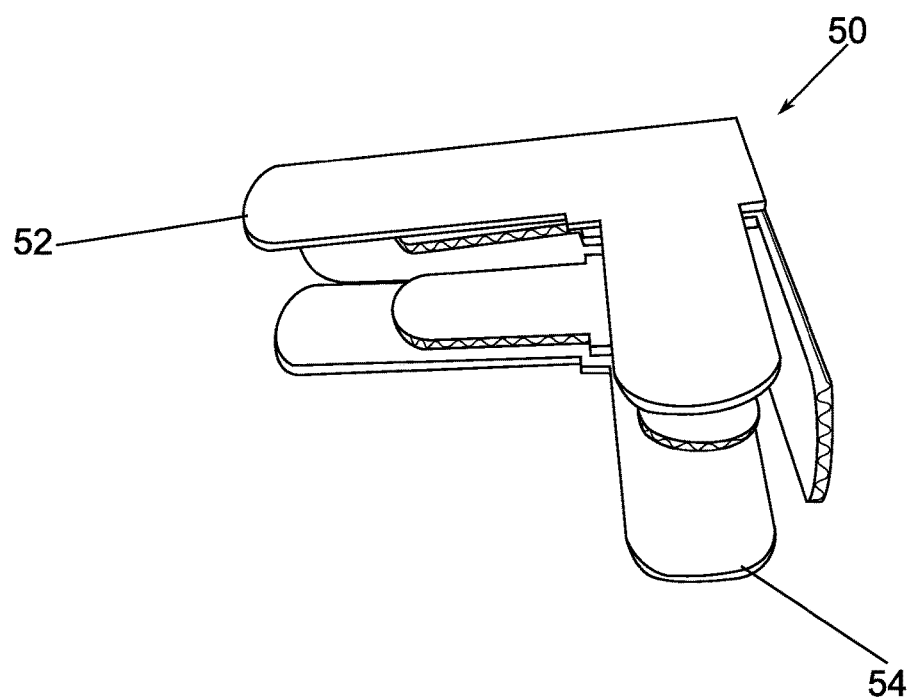
FIG. 2E is a perspective view of the ninety-degree connector formed from the sheet of material of FIG. 2A according to an embodiment of the present subject matter.
Figure 2F:
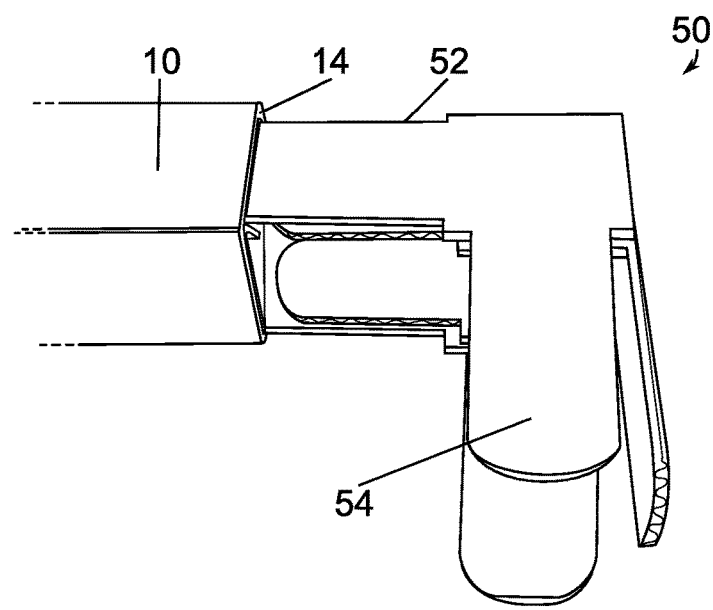
FIGS. 2F-2I are perspective views of the ninety-degree connector of FIG. 2E being employed to join together two of the elongate structural members of FIGS. 1A and 1B(i) according to an embodiment of the present subject matter.

FIG. 2A is a top plan view of a sheet of material 60 from which a ninety-degree connector may be formed according to an embodiment of the presently disclosed subject matter. The ninety-degree connector may be used, for example, for connecting ends of structural materials to one another as described in more detail herein. FIGS. 2B-2D are perspective views of the sheet of material 60 shown in FIG. 2A showing example steps of folding the sheet of material to assemble a ninety-degree connector 50 according to an embodiment of the presently disclosed subject matter. FIG. 2E is a perspective view of the ninety-degree connector 50 formed from the sheet of material 60 shown in FIG. 2A according to an embodiment of the presently disclosed subject matter.

Figure 2G:
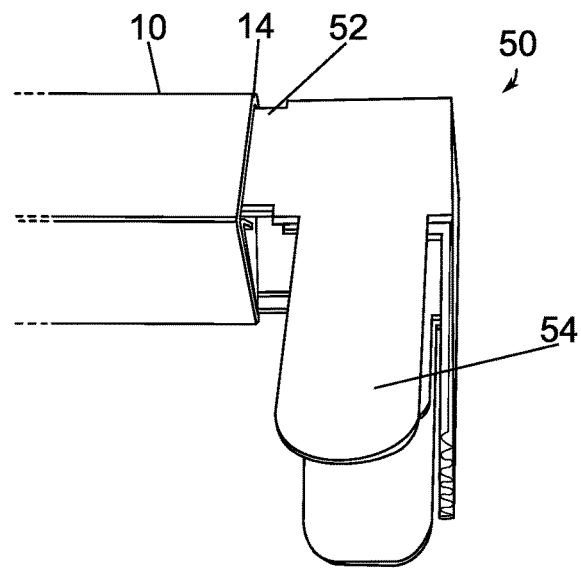
Figure 2H:
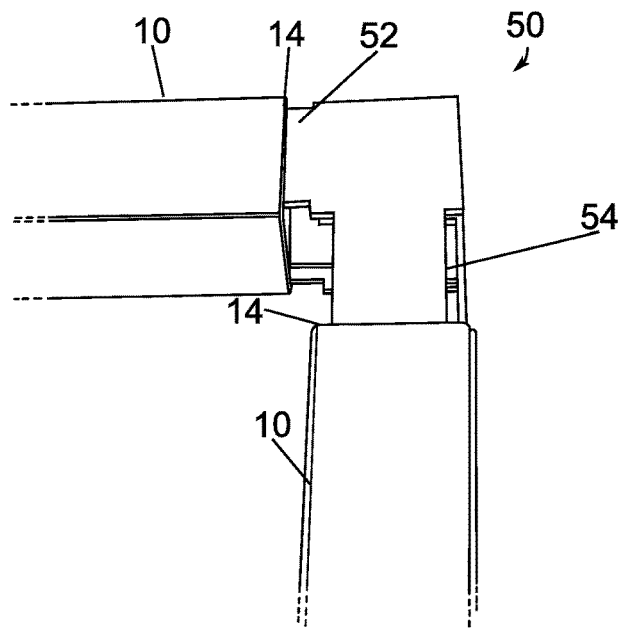
Figure 2I:
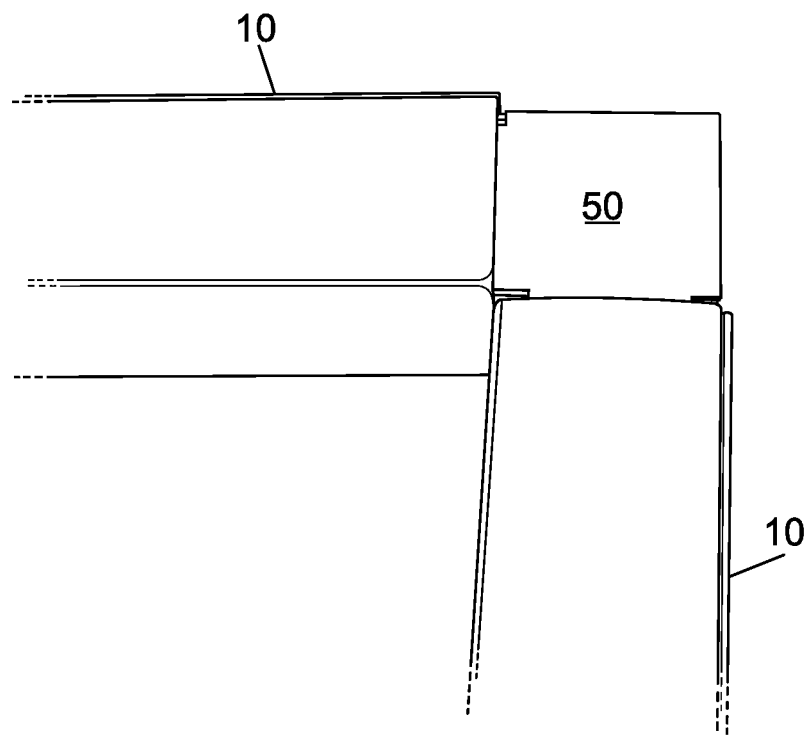

Referring now to FIGS. 2A-2I, there is shown a ninety-degree connector 50 according to an embodiment of the presently disclosed subject matter. The ninety-degree connector 50 may be employed to affix together ends of the structural members 10 together as shown in FIGS. 1A-1J. The ninety-degree connector 50, more clearly shown in FIG. 2E, includes a first male end 52 and a second male end 54 oriented at about a ninety-degree angle in respect of each other. As shown in FIGS. 2G-2I, the first male end 52 is adapted to be received in one of the open ends 14 and 16 of the structural member 10 and the second male end 54 is adapted to be received in one of the open ends 14 and 16 of another one of the structural members 10.

As shown in FIG. 2A, the ninety-degree connector 50 may be assembled from a sheet of foldable material 60. In the illustrated embodiment, the sheet 60 is a one-piece corrugated sheet, although it should be understood that the sheet 60 can be formed from other foldable materials such as fiberboard, paper board, corrugated plastics, non-corrugated plastics, other foldable materials, or combinations thereof. The sheet 60 includes a plurality of first fingers 62A-62E forming the first male end 52 and a plurality of second fingers 64A-64E forming the second male end 54. Fold lines 66A-66E may be formed in the sheet 60 to facilitate folding the sheet 60. Slits 68A and 68B may be formed through the sheet 60 to permit the fingers 62D, 62E, 64A, and 64C to be folded out of plane with finger 64B as shown in FIG. 2B.

In FIGS. 2B-2E, example steps of folding the sheet 60 to form the ninety-degree member 50 are shown. Initially, the sheet 60 may be folded along the fold lines 66A and 66B, wherein the fingers 62D and 62E are caused to be orthogonal to the finger 64B. Subsequently, the sheet 60 may be folded along the fold line 66C to position the fingers 64A, 64B, and 64C as shown in FIG. 2C. The sheet 60 may subsequently be folded along the fold lines 66D and 66E to form the ninety-degree member 50 as shown in FIGS. 2B-2E. Once the ninety-degree member 50 is assembled, the male ends 52 and 54 can be inserted into the open ends 14 and 16 of the structural members 10, as shown in FIGS. 2F-2I, to connect ends of the structural members 10 at a ninety-degree angle in respect of each other. It should be understood that an adhesive such as a double sided adhesive strip, and glue, for example, and a fastener such as a threaded fastener, for example, can be employed to substantially affix the male ends 52 and 54 of the ninety-degree member 50 to the ends of the structural members 10.

Figure 3A:
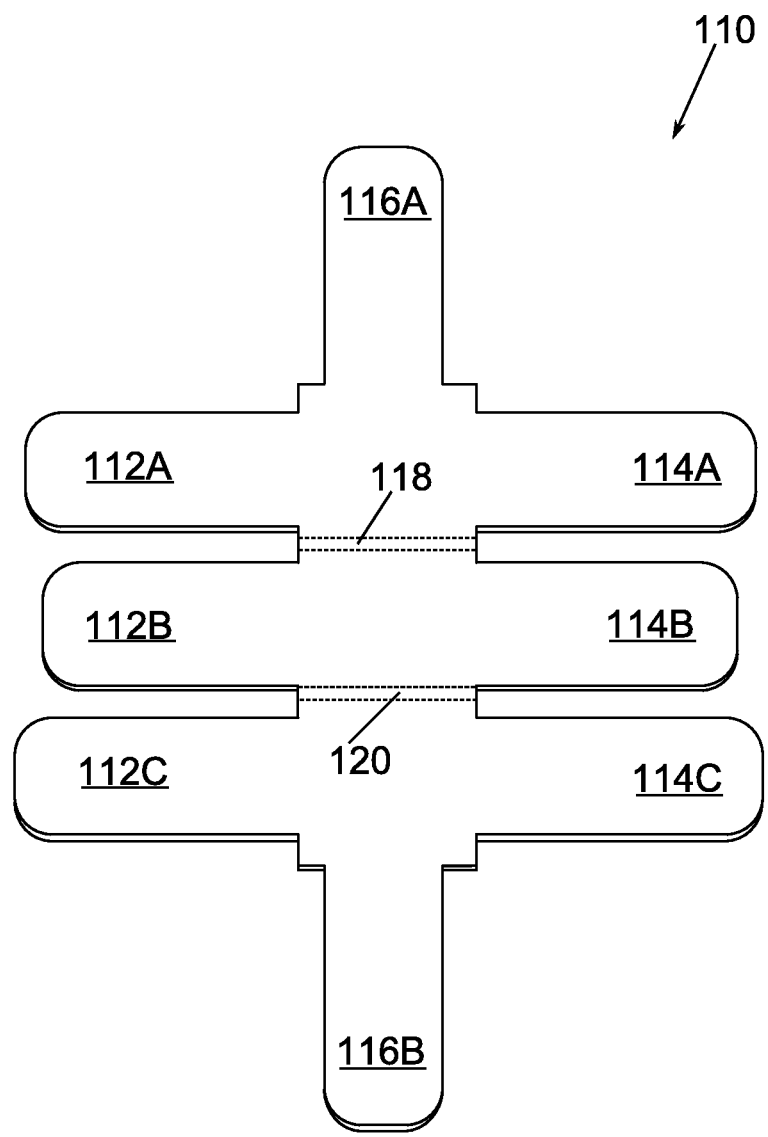
FIG. 3A is a top plan view of a sheet of material from which a T-connector is formed according to an embodiment of the present subject matter.
Figure 3B:
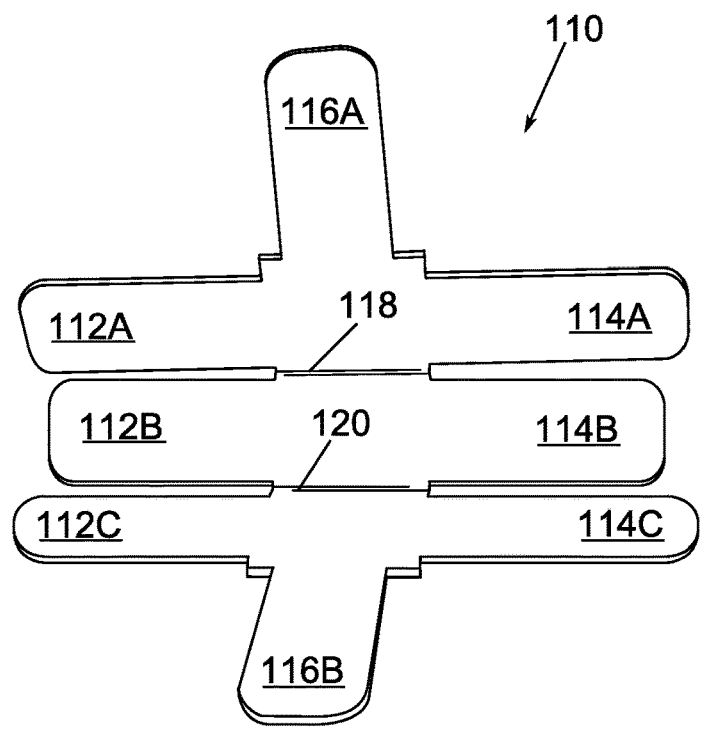
FIGS. 3B and 3C are perspective views of the sheet of material of FIG. 3A showing example steps of folding the sheet of material to form the T-connector according to an embodiment of the present subject matter.
Figure 3C:
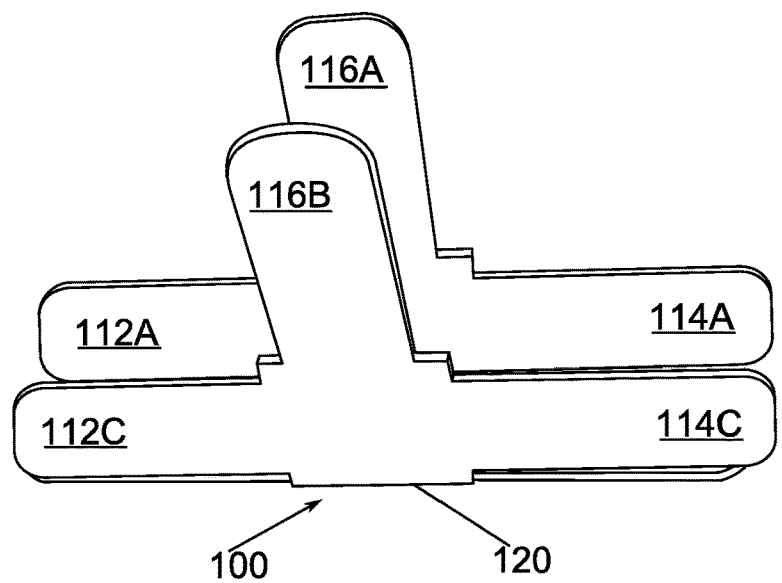
Figure 3D:
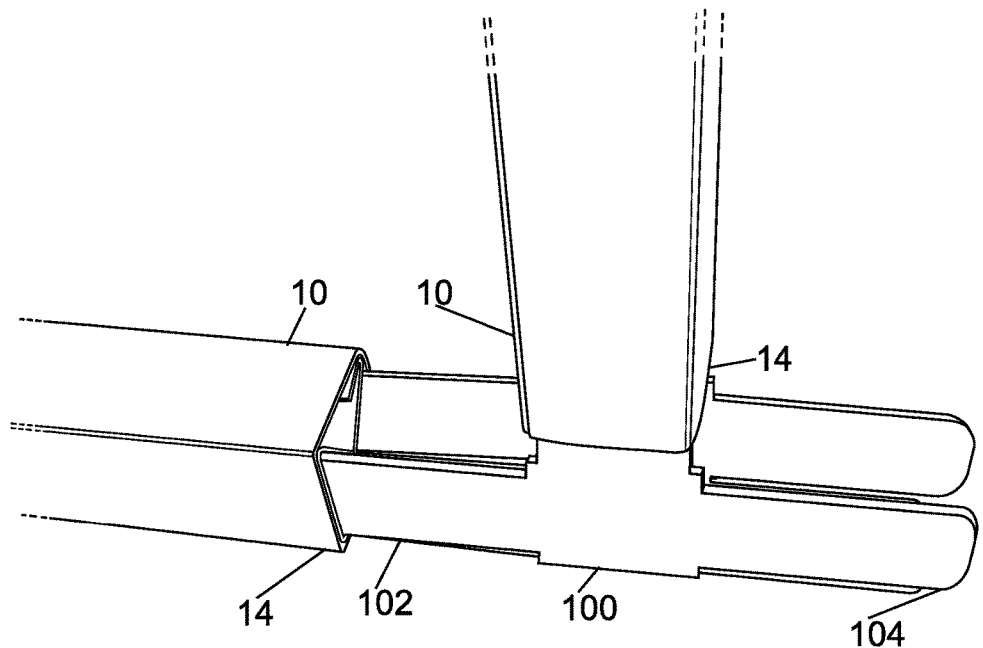
FIG. 3D-3G are perspective views of the T-connector of FIG. 3C being employed to join together three of the elongate structural members of FIGS. 1A and 1B(i) according to an embodiment of the present subject matter.
Figure 3E:
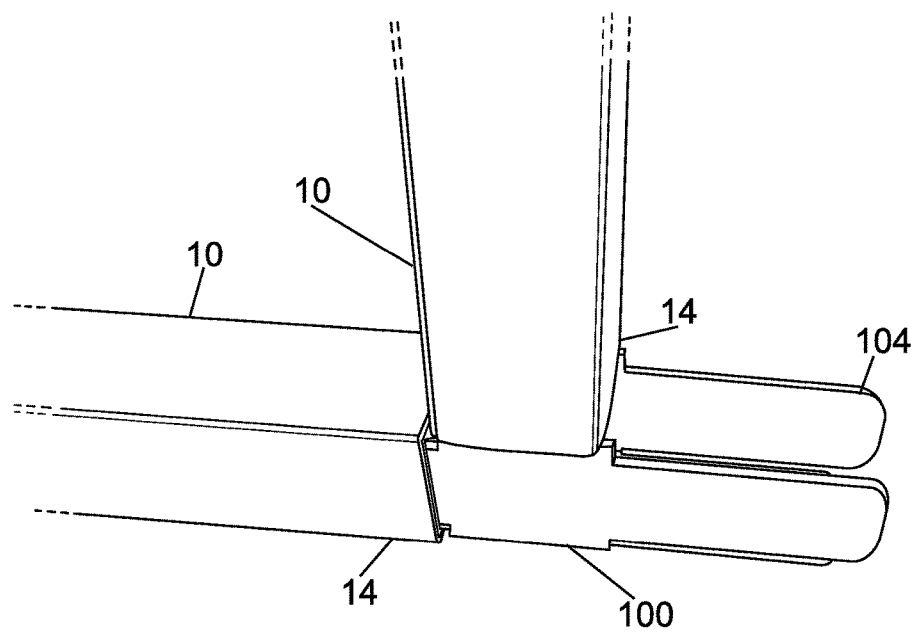
Figure 3F:
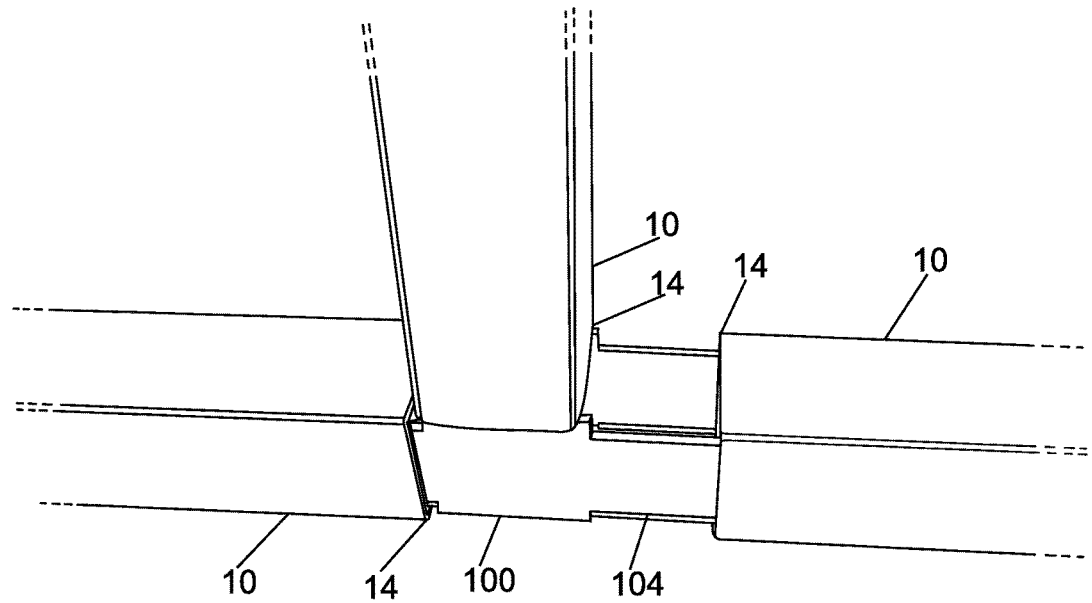
Figure 3G:
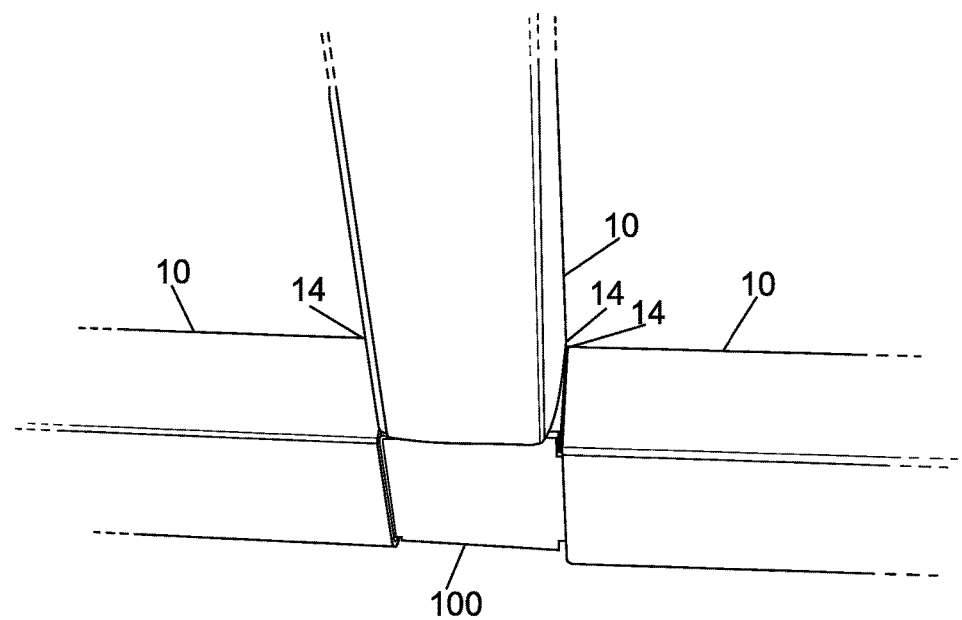

FIG. 3A illustrates a top plan view of a sheet of material 110 from which a T-connector can be assembled according to an embodiment of the present subject matter. FIGS. 3B-3C illustrate perspective views of the sheet of material 110 of FIG. 3A showing example steps of folding the sheet of material 110 to form the T-connector according to an embodiment of the presently disclosed subject matter. FIG. 3D-3G are perspective views of a T-connector 100 of FIG. 3C being employed to join together three structural members shown in FIGS. 1A and 1B(i) according to an embodiment of the presently disclosed subject matter. Referring now to FIGS. 3A-3G, the T-connector 100 is employed to join together ends of three structural members 10 as shown in FIGS. 1A-1J. The T-connector 100, more clearly shown in FIG. 3C, includes a first male end 102, a second male end 104, and a third male end 106 oriented to form a generally T-shape for the T-connector 100. The male ends 102, 104, and 106 are shaped and sized to be received in the open ends 14 and 16 of the structural members 10, wherein the T-connector 100 is employed to affix together three of the structural members 10 as shown in FIGS. 3F-3G.

As shown in FIG. 3A, the T-connector 100 may be formed from a sheet of foldable material 110. In the illustrated embodiment, the sheet 110 is a one-piece corrugated sheet, although it should be understood that the sheet 110 can be formed from other foldable materials such as, but not limited to, fiberboard, paper board, corrugated plastics, non-corrugated plastics, and other foldable materials, for example. The sheet 110 includes a plurality of first fingers 112A, 112B, and 112C forming the first male end 102, a plurality of second fingers 114A, 114B, and 114C forming the second male end 104, and a plurality of third fingers 116A and 116B forming the third male end 106. Fold lines 118 and 120 can be formed in the sheet 110 to facilitate folding the sheet 110 to form the T-connector 100.

In FIGS. 3B and 3C, example steps of folding the sheet 110 to form the ninety-degree member 100 are shown. In an initial step, the sheet 110 is folded along the fold lines 118 and 120, wherein the fingers 116A and 116B are caused to be orthogonal to the fingers 112B and 114B and form the generally T-shaped T-connector 100. Once the T-connector 100 is formed, the male ends 102, 104, and 106 can be inserted into the open ends 14 and 16 of the structural members 10, as shown in FIGS. 3D-3G. It should be understood that an adhesive such as, but not limited to, a double sided adhesive strip and a glue, for example, and a fastener such as a threaded fastener, for example, can be employed to substantially secure the male ends 102, 104, and 106 of the T-connector 100 to the structural members 10.

Figure 4A:
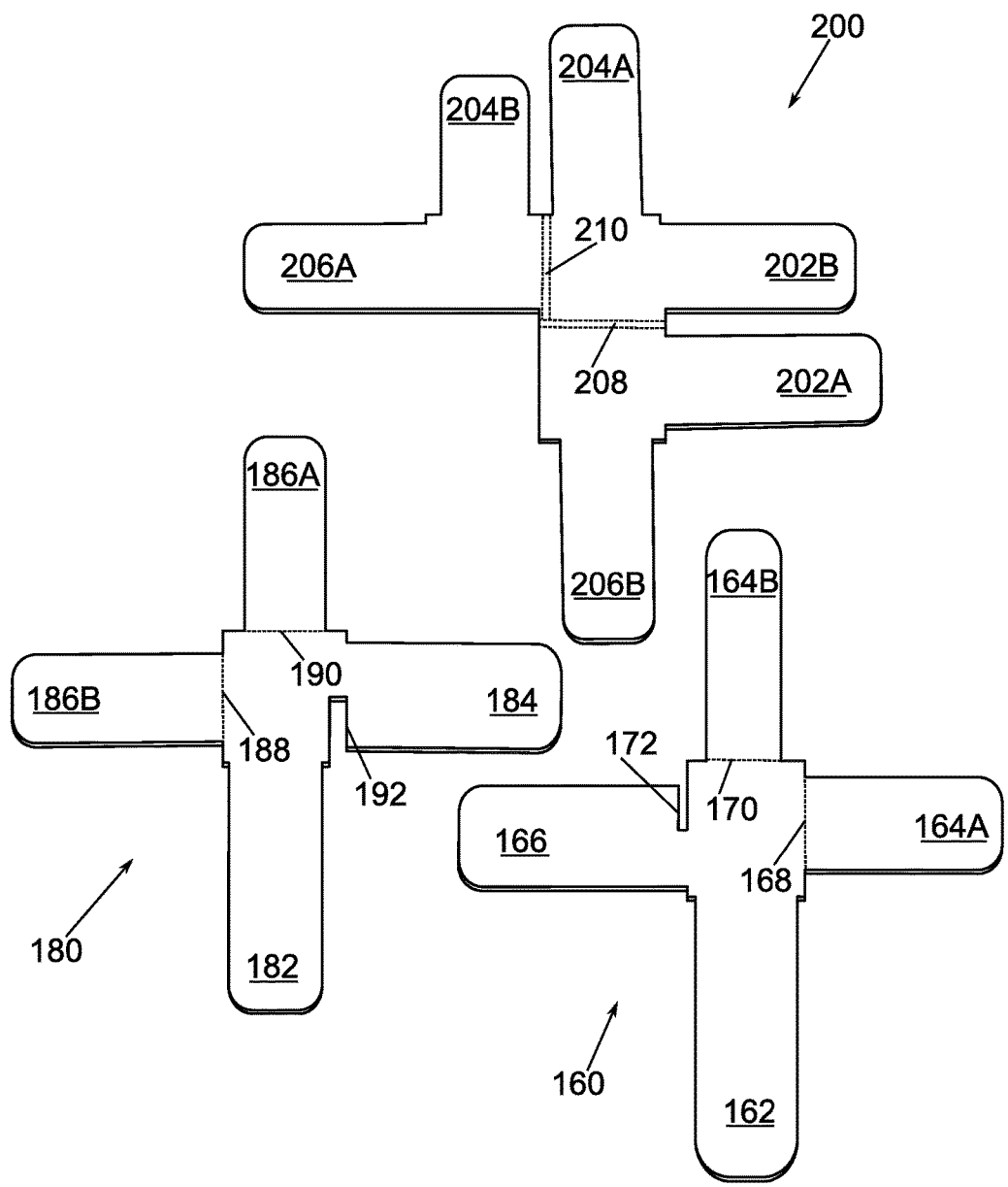
FIG. 4A is a top plan view of sheets of material from which a corner connector is formed according to an embodiment of the present subject matter.
Figure 4B:
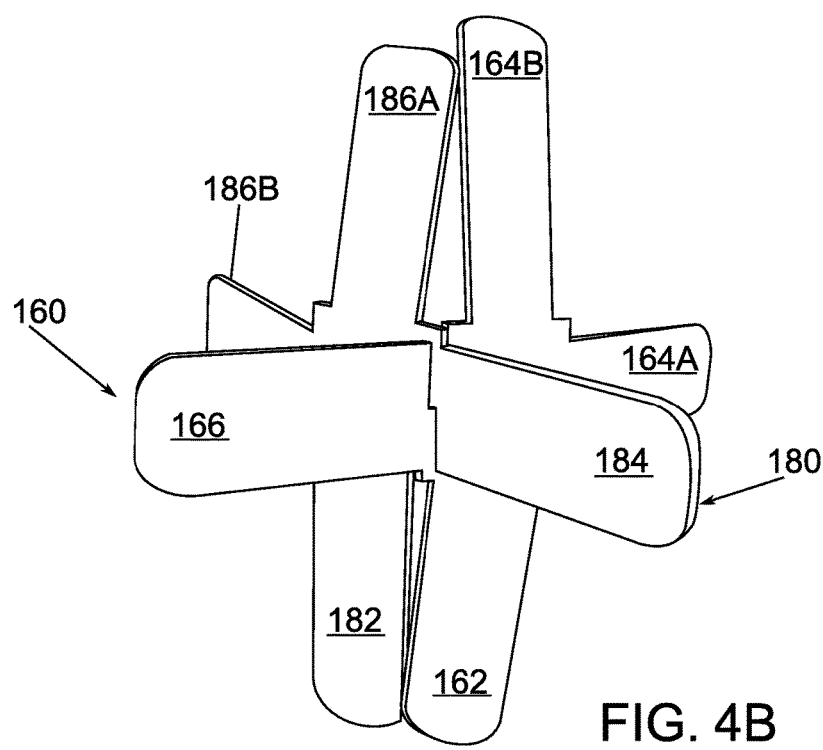
FIGS. 4B-4J are perspective views of the sheets of material of FIG. 4A showing steps of interconnecting and folding the sheets of material of FIG. 4A to form the corner connector according to an embodiment of the present subject matter.
Figure 4C:
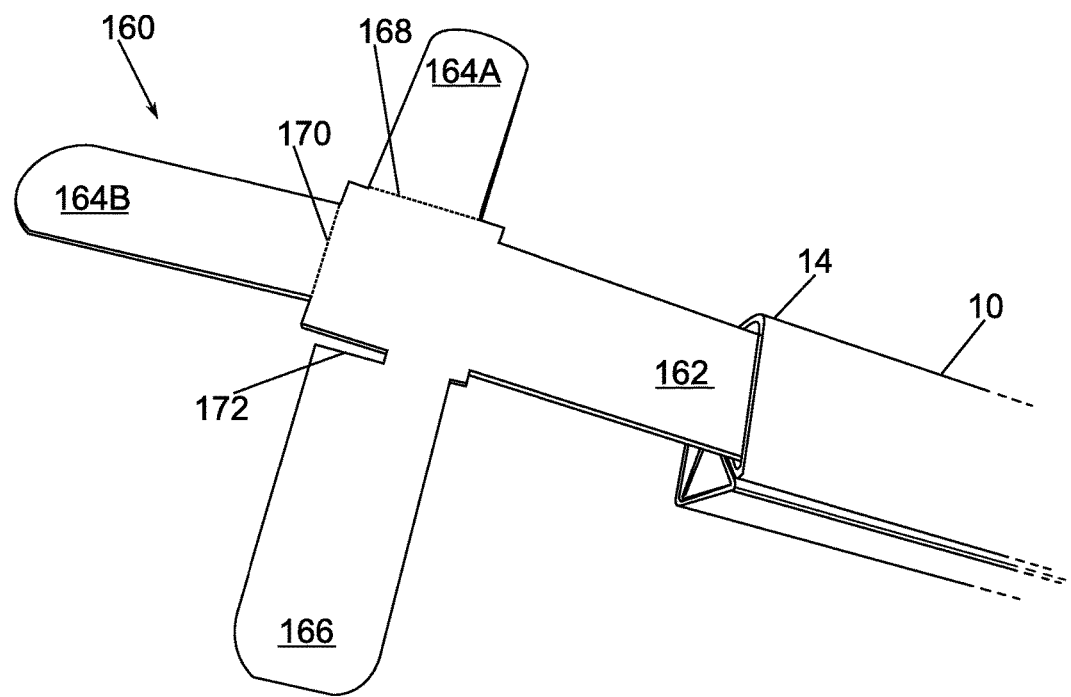
Figure 4D:
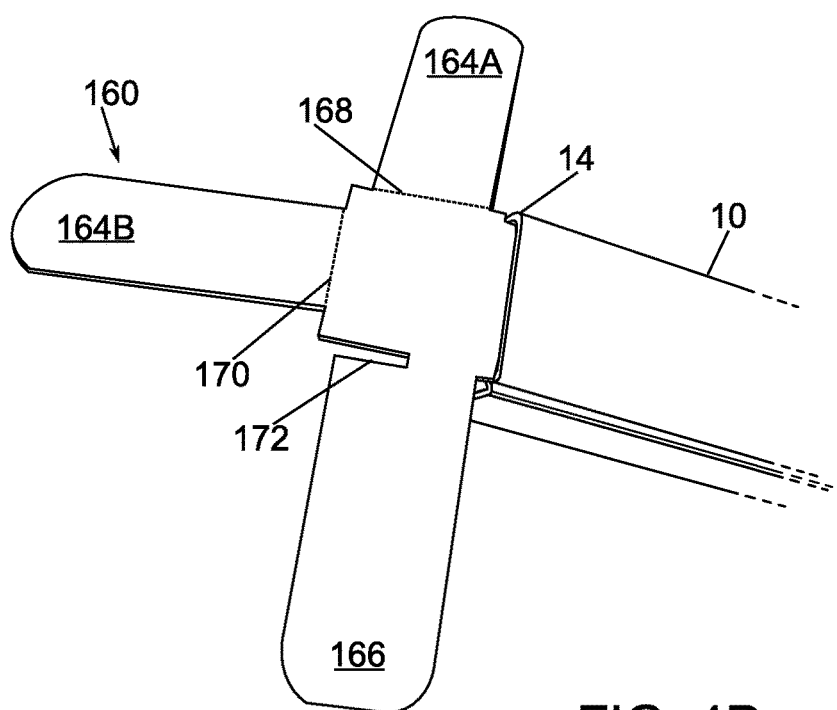
Figure 4E:
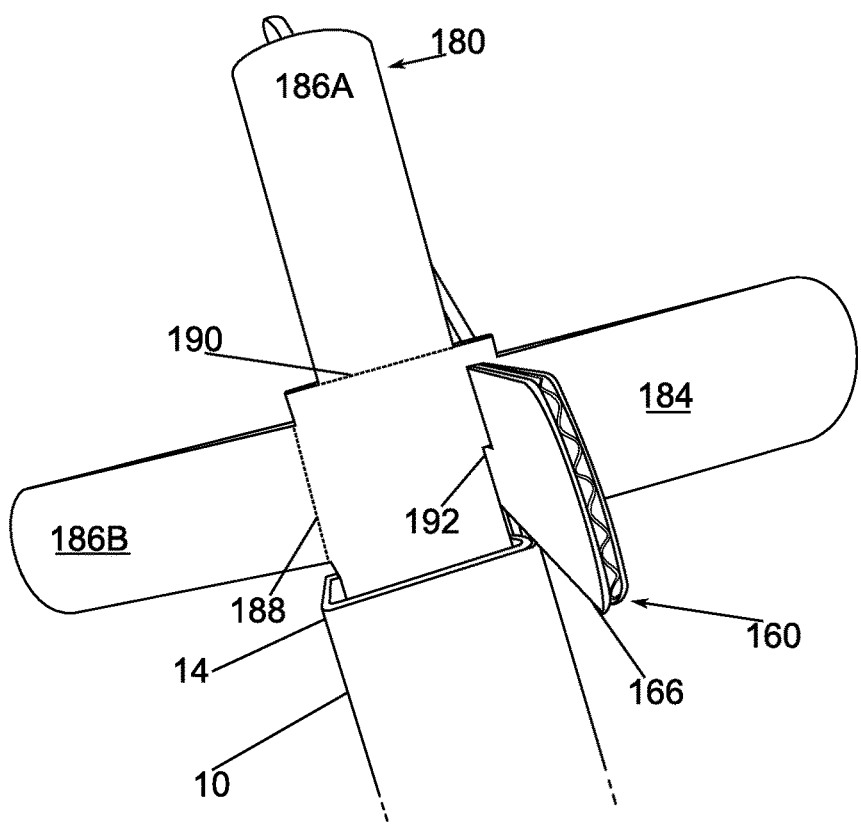
Figure 4F:
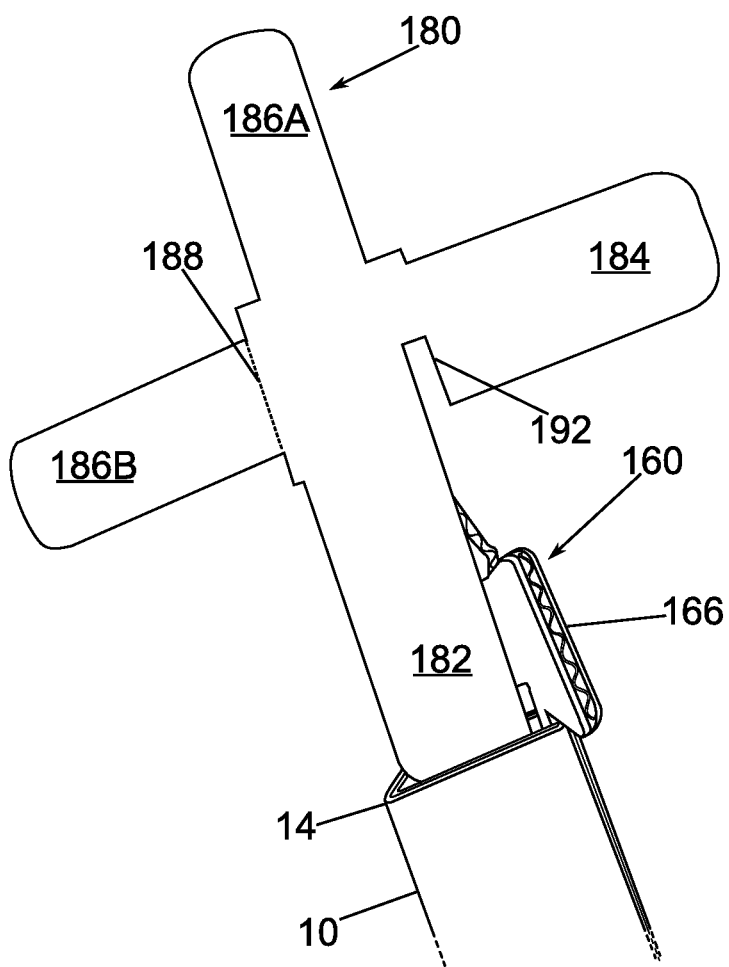

FIG. 4A illustrates a top plan view of sheets of material 160, 180, and 200 from which a corner connector may be assembled according to an embodiment of the presently disclosed subject matter. FIGS. 4B-4J illustrate perspective views of the sheets of material 160, 180, and 200 of FIG. 4A showing example steps of interconnecting and folding the sheets of material 160, 180, and 200 of FIG. 4A to assemble a corner connector according to an embodiment of the presently disclosed subject matter. FIGS. 4K-4N are perspective views of the corner connector of FIG. 4I being employed to join together three of the elongate structural members of FIGS. 1A and 1B according to an embodiment of the presently disclosed subject matter. Referring now to FIGS. 4A-4N, there is shown a corner connector 150 according to an embodiment of the presently disclosed subject matter. The corner connector 150 is employed to join together three of the structural members 10 illustrated in FIGS. 1A-1J. The corner connector 150, more clearly shown in FIG. 4I, includes a first male end 152, a second male end 154, and a third male end 156 oriented to assemble a three-way corner shape to the corner connector 150. The male ends 152, 154, and 156 are adapted to be received in the open ends 14 and 16 of the structural members 10, wherein the corner connector 150 is employed to join together three of the structural members 10 as shown in FIGS. 4L-4N.

As shown in FIG. 4A, the corner connector 150 is formed from a first sheet 160, a second sheet 180, and a third sheet 200. In the illustrated embodiment, the sheets 160, 180, and 200 are a one-piece corrugated sheet, although it should be understood that the sheets 160, 180, and 200 can be formed from other foldable materials such as, but not limited to, fiberboard, paper board, corrugated plastics, non-corrugated plastics, other foldable materials, or combinations thereof, for example.

The sheet 160 includes a plurality of fingers 162, 164A, 164B, and 166. Fold lines 168 and 170 are formed in the sheet 160 to facilitate folding the sheet 160. A slot 172 is formed in the sheet 160 adjacent a base of the finger 166. The sheet 180 includes a plurality of fingers 182, 184, 186A, and 186B. Fold lines 188 and 190 are formed in the sheet 180 to facilitate folding the sheet 180. A slot 192 is formed in the sheet 180 adjacent a base of the finger 184 adapted to cooperate with the slot 172 of the sheet 160 to join together the sheet 160 and the sheet 180 as shown in FIG. 4B. The sheet 200 includes a plurality of fingers 202A, 202B, 204A, 204B, 206A, and 206B. Fold lines 208 and 210 are formed in the sheet 200 to facilitate folding the sheet 200. In the corner connector 150, the fingers 162, 182, 202A, and 202B form the first male end 152; the fingers 164A, 164B, 184, 204A, and 204B form the second male end 154; and the fingers 166, 186A, 186B, 206A, and 206B form the third male end 156.

Figure 4G:
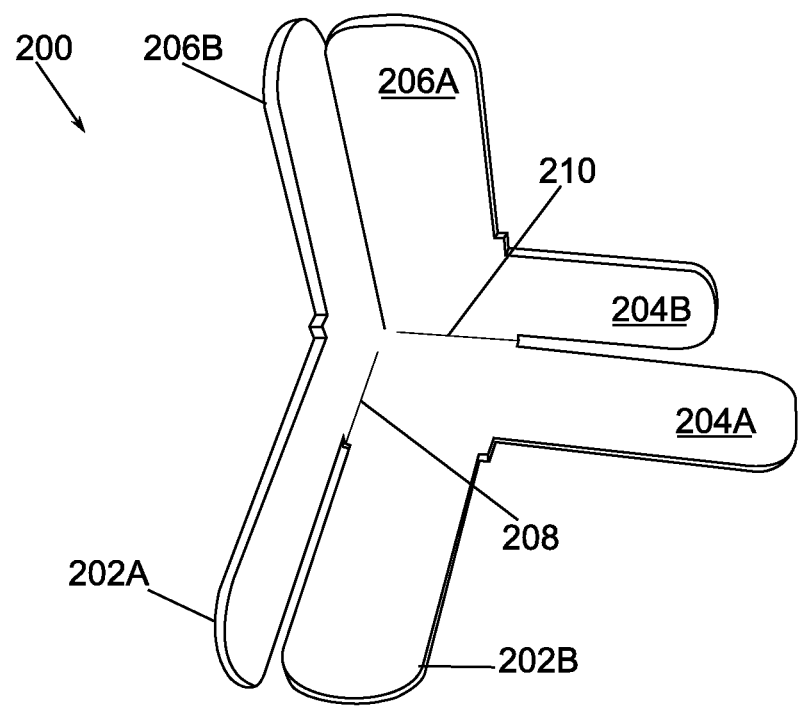
Figure 4H:
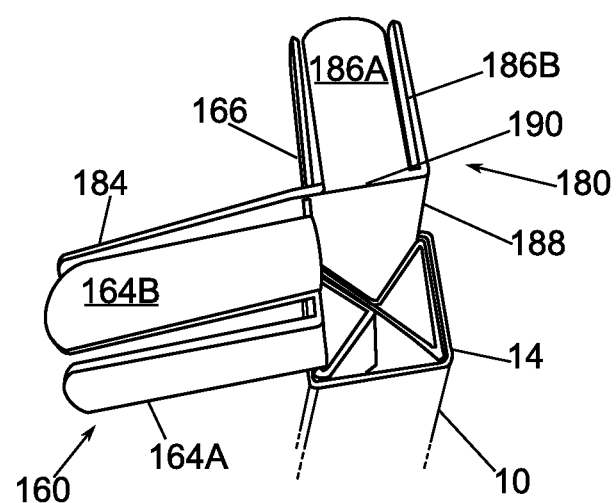

Referring now to FIGS. 4C-4J, example steps of interconnecting and folding the sheets 160, 180, and 200 to form the corner connector 150 are shown. Referring particularly to FIGS. 4C-4F, the finger 162 of the sheet 160 is inserted into the end 14 of the structural member 10. The finger 182 of the sheet 180 is also inserted into the end 14 of the structural member 10, wherein the slots 172 and 182 of the sheets 160 and 180, respectively, cooperate to interconnect the sheets 160 and 180. As shown in FIG. 4H, the fingers 164A and 164B are folded along the fold lines 168 and 170, respectively, toward the finger 184 to form a portion of the second male end 154 of the corner connector 150. In a similar manner, the fingers 186A and 186B are folded along the fold lines 190 and 188, respectively, toward the finger 166 to form a portion of the third male end 156 of the corner connector 150. The sheet 200 is folded along the fold lines 208 and 210 as shown in FIG. 4G.

Figure 4I:
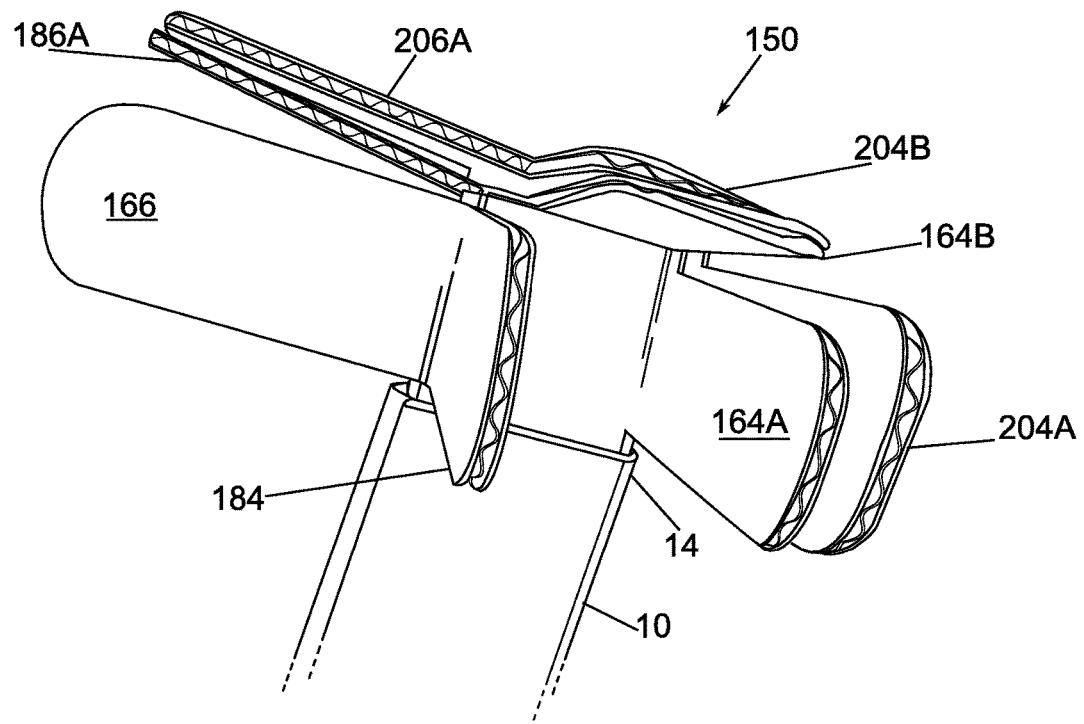
Figure 4J:
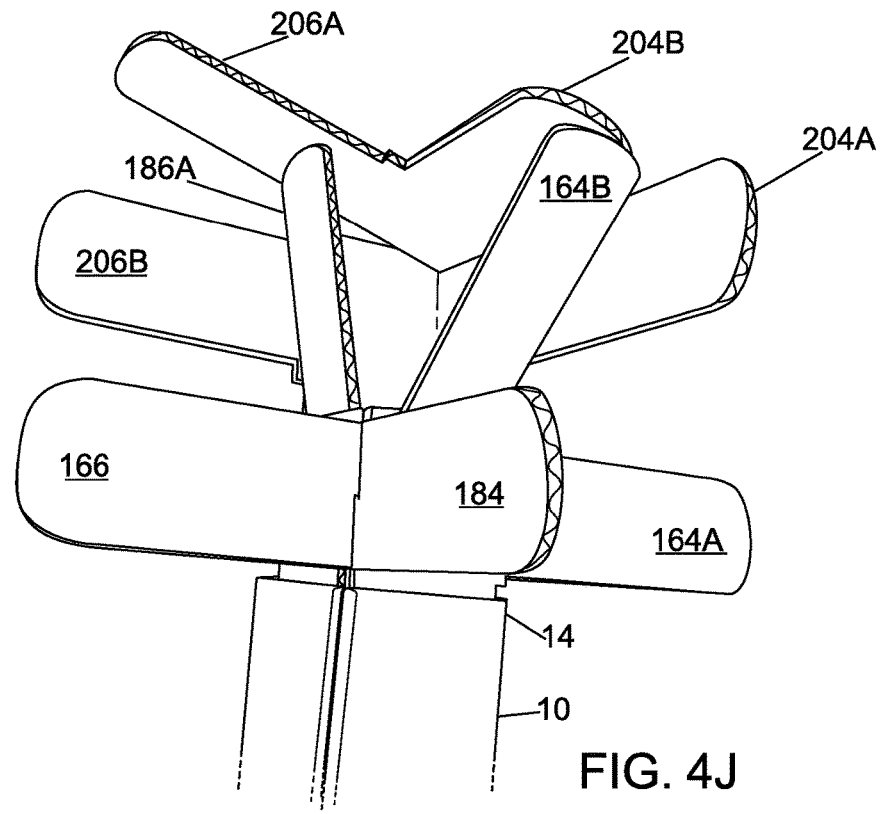
Figure 4K:
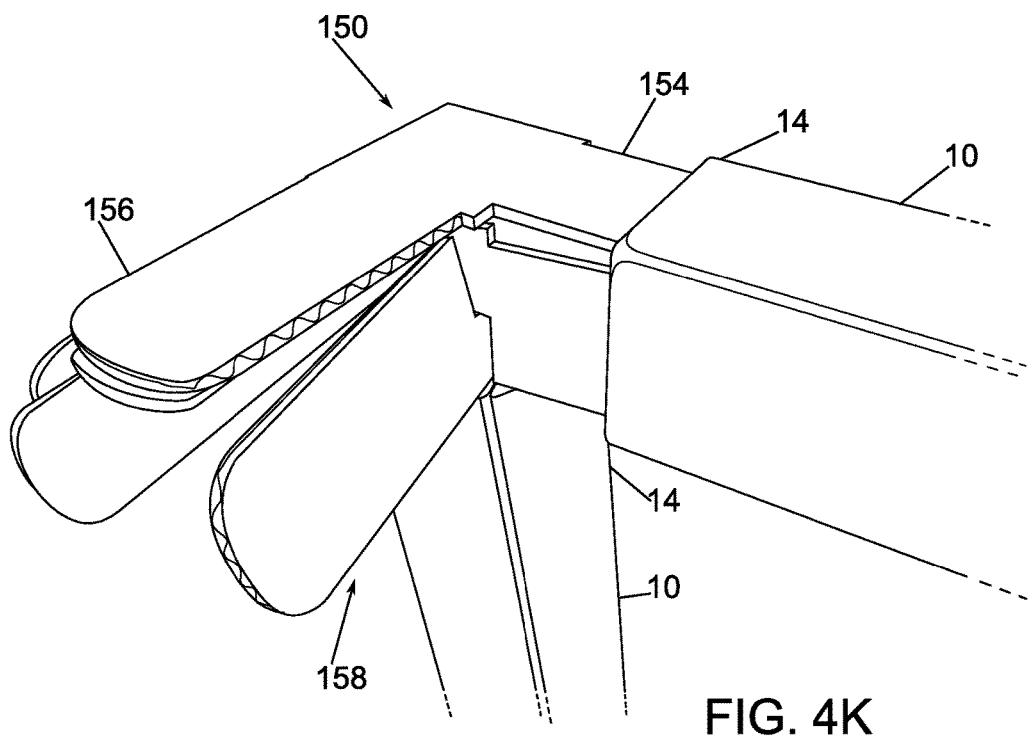
FIGS. 4K-4N are perspective views of the corner connector of FIG. 4I being employed to join together three of the elongate structural members of FIGS. 1A and 1B according to an embodiment of the present subject matter.
Figure 4L:
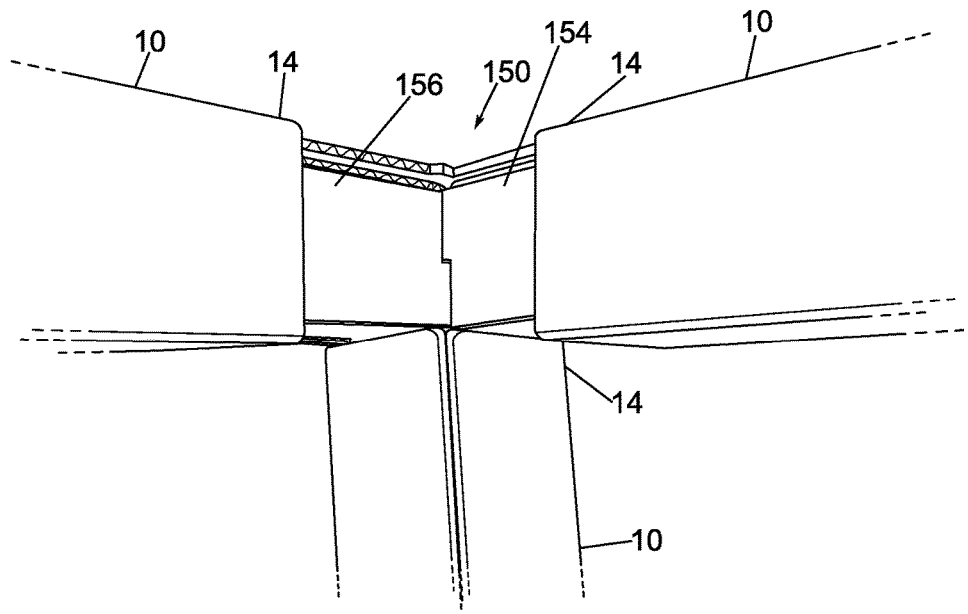
Figure 4M:
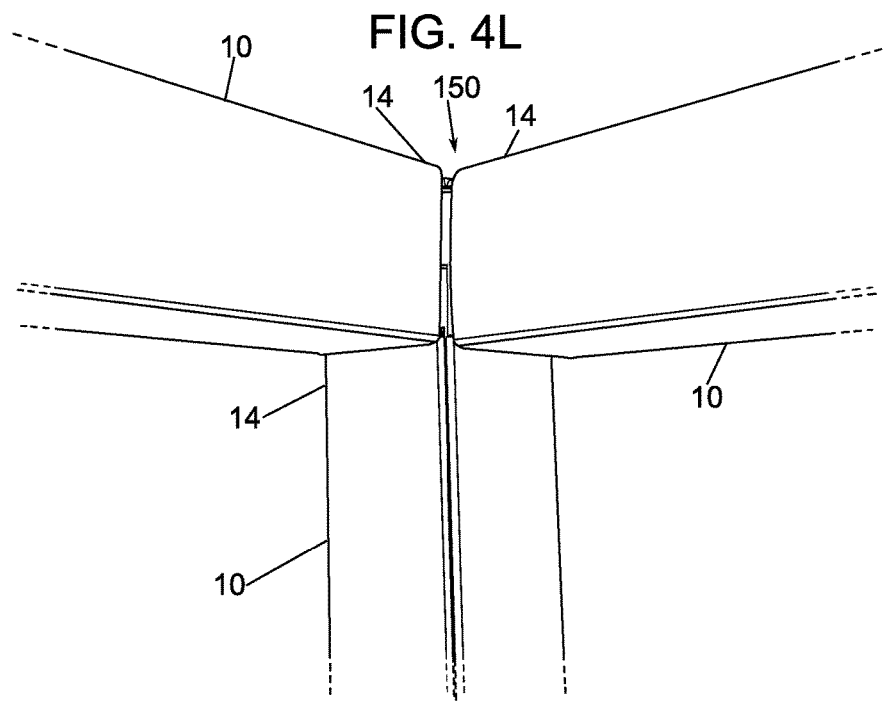
Figure 4N:
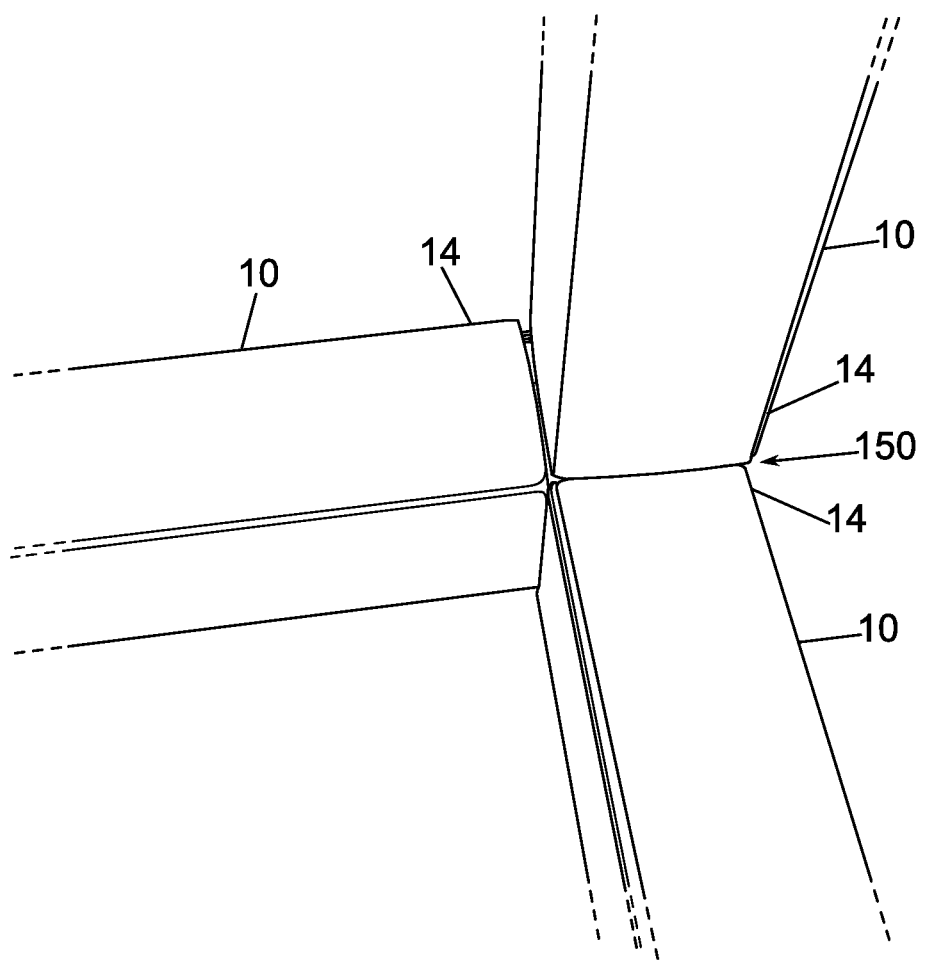

Now referring to FIGS. 4I-4J, the fingers 202A and 202B are inserted into the end 14 of the structural member 10, wherein the fingers 162, 182, 202A, and 202B form the first male end 152 of the corner connector 150. Further, the fingers 204A and 204B are substantially aligned with the fingers 164A and 164B, respectively, and together with the finger 184, form the second male end 154 of the corner connector 150. Similarly, the fingers 206A and 206B are substantially aligned with the fingers 186A and 186B, respectively, and together with the finger 166, form the third male end 156 of the corner connector 150. Once the corner connector 150 is formed as shown in FIG. 4I, the male ends 154 and 156 can be inserted into the open ends 14 and 16 of the structural members 10, as shown in FIGS. 4K-4N. It should be understood that an adhesive such as, but not limited to, a double sided adhesive strip and a glue, for example, and a fastener such as a threaded fastener, for example, can be employed to substantially secure the male ends 152, 154, and 156 of the corner connector 150 to the structural members 10.

It should be understood that a plurality of the structural members 10, the ninety-degree connectors 50, the T-connectors 100, and the corner connectors 150 can be used to construct a desired structure or framework for a variety of items such as a chair, a table, a cot, a shelf, a shipping pallet, a shipping crate, a shelter, and the like, for example. It should also be understood that one or more panels can be coupled to the structural members 10 and the connectors 50, 100, and 150 to cover at least a portion of the structure or the framework formed from the structural members 10 and the connectors 50, 100, and 150.

The sheets 20, 60, 110, 160, 180, and 200 can be shipped from a manufacturing location to an end user as flat sheet material to minimize a cost of shipping. The end user can fold the sheets 20, 60, 110, 160, 180, and 200 to form the respective structural members 10 and the connectors 50, 100, and 150. Once formed, the structural members 10 and the connectors 50, 100, and 150 can be joined together to assemble or form the desired structure or framework.

Figure 5:
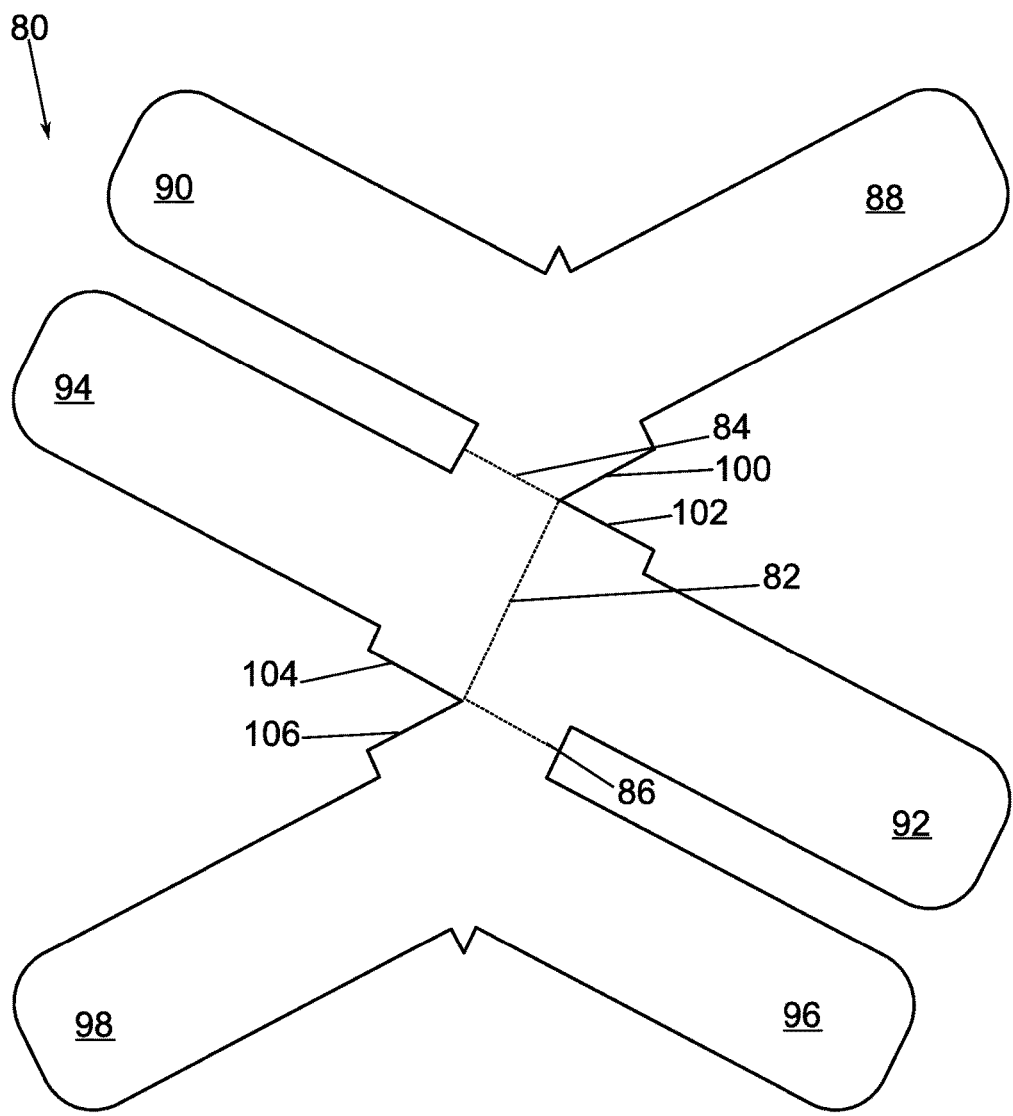
FIG. 5 is a top plan view of a sheet of material from which a truss connector may be formed according to an embodiment of the present subject matter.

FIG. 5 is a top plan view of a sheet of material 80 from which a truss connector may be formed according to an embodiment of the present subject matter. Referring to FIG. 5, the sheet of material 80 defines several fold lines 82, 84, and 86 and fingers 88, 90, 92, 94, 96, and 98. In a first step to form the truss connector, the sheet of material 80 can be folded along fold lines 84 and 86 such that the portion of the sheet of material 80 including fingers 88 and 90 is substantially parallel with the portion of the sheet of material 80 including fingers 96 and 98. Further, the portions including fingers 88, 90, 96, and 98 are positioned to be substantially perpendicular to the portion including fingers 92 and 94. In a subsequent and final step for assembling the truss connector, the sheet of material 80 can be folded along fold line 82 such that edges 100 and 102 touch and such that edges 104 and 106 touch. Touching edge pairs 100/102 and 104/106 can optionally be affixed using an adhesive means as disclosed herein. As a result, fingers 90, 94, and 98 are substantially aligned to form a first male end to be received by a structural member; further, fingers 88, 92, and 96 are substantially aligned to form a second male end to be received by another structural member. The first male end (formed from fingers 90, 94, and 98) points in a direction that is greater than 90° apart from the direction of the second male end (formed from fingers 88, 92, and 96). Such a sheet can also be configured to provide more fingers for each male end, or double-thickness fingers, thereby reinforcing the integrity of the male end. Alternately, such a truss connector can be formed from more than one sheet of material, consistent with the disclosure herein.

Those of skill in the art will appreciate that some of the elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the presently disclosed subject matter. Also, common but well-understood elements that are useful or necessary in a commercially feasible embodiment are often not depicted in order to facilitate a less obstructed view of these various embodiments of the presently disclosed subject matter. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A substantially flat sheet of material for forming a three-dimensional connector comprising two male ends, the sheet of material comprising:
   a base having a plurality of fingers extending therefrom, wherein each finger comprises a base to distal tip length greater than a substantially constant width, and a plurality of fold lines, wherein the plurality of fingers comprises a first set of fingers and a second set of fingers, wherein folding the sheet along the fold lines configures the plurality of fingers to form a plurality of male ends comprising the connector, wherein a first male end is formed from the first set of fingers, wherein the first set of fingers comprises three fingers, wherein at least two fingers are orthogonal to each other and one finger is parallel to at least one finger from the two fingers after said folding, a second male end is formed from the second set of fingers, wherein the first set of fingers comprises three fingers, wherein at least two fingers are orthogonal to each other and one finger is parallel to at least one finger from the two fingers after said folding; and wherein the first male end and the second male end are not parallel to each other.

2. The sheet of material of claim 1 being made of one of paper, plastic, wood, cloth, metal, and composite.

3. The sheet of material of claim 1, wherein folding the sheet of material along the fold lines forms a connector wherein the first male end and the second male end are orthogonal to one another.

4. The sheet material of claim 1, wherein folding the sheet of material along the fold lines forms a connector wherein the first male end and the second male end are are about 135° apart.

5. A framework comprising the three-dimensional connector formed from the sheet of material of claim 1, wherein said framework is one of a chair, a table, a desk, a trunk, a bench, a stool, a cot, a shelf, a pallet, a crate, a platform, a raised floor, a display, and a shelter.

6. A substantially flat sheet of material for forming a three-dimensional connector comprising three male ends, the sheet of material comprising:

a base having a plurality of fingers extending therefrom, wherein each finger comprises a base to distal tip length greater than a substantially constant width, and a plurality of fold lines, wherein the plurality of fingers comprises a first set of fingers, a second set of fingers, and a third set of fingers, wherein folding the sheet along the fold lines configures the plurality of fingers to form a plurality of male ends comprising the connector, wherein a first male end is formed from the first set of fingers, wherein the first set of fingers comprises three fingers, wherein at least two fingers are orthogonal to each other and one finger is parallel to at least one finger from the two fingers after said folding, a second male end is formed from the second set of fingers, wherein the first set of fingers comprises three fingers, wherein at least two fingers are orthogonal to each other and one finger is parallel to at least one finger from the two fingers after said folding; and a third male end is formed from the third set of fingers, wherein the third set of fingers comprises two fingers which are parallel to one another after said folding.

7. The sheet of material of claim 6 being made of one of paper, plastic, wood, cloth, metal, and composite.

8. The sheet of material of claim 6, wherein the first male end and the second male end are each orthogonal to the third male end and the first male end is directed 180° away from the second male end.

9. A framework comprising the three-dimensional connector formed from the sheet of material of claim 6, wherein said framework is one of a chair, a table, a desk, a trunk, a bench, a stool, a cot, a shelf, a pallet, a crate, a platform, a raised floor, a display, and a shelter.

10. A substantially flat sheet of material for forming a three-dimensional connector comprising three male ends, the sheet of material comprising:

a base having a plurality of fingers extending therefrom, wherein each finger comprises a base to distal tip length greater than a substantially constant width, and a plurality of fold lines, wherein the plurality of fingers comprises a first set of fingers, a second set of fingers, and a third set of fingers, wherein folding the sheet along the fold lines configures the plurality of fingers to form a plurality of male ends comprising the connector, wherein a first male end is formed from the first set of fingers, wherein the first set of fingers comprises two fingers which are orthogonal to one another after said folding, a second male end is formed from the second set of fingers, wherein the second set of fingers comprises two fingers which are orthogonal to one another after said folding; and a third male end is formed from the third set of fingers, wherein the third set of fingers comprises two fingers which are orthogonal to one another after said folding.

11. The sheet of material of claim 10 being made of one of paper, plastic, wood, cloth, metal, and composite.

12. The sheet of material of claim 10, wherein the first, second, and third male ends are orthogonal to one another.

13. A framework comprising the three-dimensional connector formed from the sheet of material of claim 10, wherein said framework is one of a chair, a table, a desk, a trunk, a bench, a stool, a cot, a shelf, a pallet, a crate, a platform, a raised floor, a display, and a shelter.

* * * * *